United States Patent
Park et al.

(10) Patent No.: US 10,296,632 B2
(45) Date of Patent: May 21, 2019

(54) SYNCHRONIZATION ON REACTIVATION OF ASYNCHRONOUS TABLE REPLICATION

(71) Applicant: SAP SE, Walldorf (DE)

(72) Inventors: Chang Gyoo Park, Seoul (KR); Deok Koo Kim, Seoul (KR); Kyu Hwan Kim, Seoul (KR); Juchang Lee, Seoul (KR)

(73) Assignee: SAP SE, Walldorf (DE)

( * ) Notice: Subject to any disclaimer, the term of this patent is extended or adjusted under 35 U.S.C. 154(b) by 504 days.

(21) Appl. No.: 14/871,765

(22) Filed: Sep. 30, 2015

(65) Prior Publication Data

US 2016/0371319 A1    Dec. 22, 2016

Related U.S. Application Data

(60) Provisional application No. 62/182,409, filed on Jun. 19, 2015, provisional application No. 62/182,408, (Continued)

(51) Int. Cl.
*G06F 7/00* (2006.01)
*G06F 17/00* (2006.01)
(Continued)

(52) U.S. Cl.
CPC .. *G06F 17/30578* (2013.01); *G06F 17/30362* (2013.01); *G06F 17/30377* (2013.01); *G06F 17/30545* (2013.01); *G06F 17/30598* (2013.01); *G06F 17/30864* (2013.01); *G06F 11/1451* (2013.01)

(58) Field of Classification Search
CPC ......... G06F 17/30578; G06F 17/30362; G06F 17/30377
See application file for complete search history.

(56) References Cited

U.S. PATENT DOCUMENTS 6,397,352 B1    5/2002   Chandrasekaran et al.
7,133,891 B1 *  11/2006  Uceda-Sosa ........ H04L 67/1008
                                                                 709/203

(Continued)

OTHER PUBLICATIONS

Binnig, C. et al., "Distributed Snapshot Isolation: Global Transactions Pay Globally, Local Transactions Pay Locally", VLDB J. 23(6): 987-1011 (2014).

(Continued)

*Primary Examiner* — Hasanul Mobin
(74) *Attorney, Agent, or Firm* — Klarquist Sparkman, LLP

(57) ABSTRACT

Technologies are described for performing synchronization within a database environment. A source host stores multiple database tables and a replica host stores copies of the multiple database tables. During synchronization, replication log replay is blocked at the replica node, and a multithreaded process locks the multiple database tables of the source hosts, reactivates replication log generation for each of the multiple database tables, and then unlocks the database tables. A synchronization timestamp is acquired and used to synchronize the multiple database tables with the copies of the multiple database tables. After synchronization, replication log replay is reactivated at the replica host for the copies of the multiple database tables.

20 Claims, 14 Drawing Sheets

Related U.S. Application Data filed on Jun. 19, 2015, provisional application No. 62/182,405, filed on Jun. 19, 2015.

(51) Int. Cl.
*G06F 17/30* (2006.01)
*G06F 11/14* (2006.01)

(56) References Cited

U.S. PATENT DOCUMENTS

| | | | |
|---|---|---|---|
| 7,305,421 B2 | 12/2007 | Cha et al. | |
| 7,478,400 B1 | 1/2009 | Banerjee et al. | |
| 8,442,962 B2 | 5/2013 | Lee et al. | |
| 8,700,660 B2 | 4/2014 | Lee et al. | |
| 8,768,927 B2 | 7/2014 | Yoon et al. | |
| 8,782,100 B2 | 7/2014 | Yoon et al. | |
| 8,793,276 B2 | 7/2014 | Lee et al. | |
| 8,909,604 B1 | 12/2014 | Holenstein et al. | |
| 8,918,436 B2 | 12/2014 | Yoon et al. | |
| 8,935,205 B2 | 1/2015 | Hildenbrand et al. | |
| 9,009,182 B2 | 4/2015 | Renkes et al. | |
| 9,037,677 B2 | 5/2015 | Lee et al. | |
| 9,063,969 B2 | 6/2015 | Lee et al. | |
| 9,098,522 B2 | 8/2015 | Lee et al. | |
| 9,632,878 B1* | 4/2017 | Maccanti | G06F 11/1469 |
| 10,025,673 B1* | 7/2018 | Maccanti | G06F 11/1458 |
| 2003/0014598 A1* | 1/2003 | Brown | G06F 11/1076 711/141 |
| 2003/0061537 A1 | 3/2003 | Cha et al. | |
| 2003/0182329 A1* | 9/2003 | Sato | G06F 11/1464 |
| 2005/0193041 A1* | 9/2005 | Bourbonnais | G06F 17/30578 |
| 2006/0190497 A1* | 8/2006 | Inturi | G06F 17/30297 |
| 2007/0186068 A1* | 8/2007 | Agrawal | G06F 11/1456 711/162 |
| 2008/0028009 A1* | 1/2008 | Ngo | G06F 11/2097 |
| 2008/0065670 A1 | 5/2008 | Cha et al. | |
| 2009/0037416 A1* | 2/2009 | Raghavan | G06F 17/30362 |
| 2009/0240739 A1* | 9/2009 | Bhatt | G06F 9/526 |
| 2010/0114826 A1 | 5/2010 | Voutilainen et al. | |
| 2010/0274587 A1* | 10/2010 | Gamboa | G06Q 10/0637 705/3 |
| 2011/0087633 A1* | 4/2011 | Kreuder | G06F 17/30578 707/610 |
| 2011/0289049 A1 | 11/2011 | Zeng et al. | |
| 2012/0084273 A1 | 4/2012 | Lee et al. | |
| 2012/0084274 A1 | 4/2012 | Renkes et al. | |
| 2012/0102006 A1* | 4/2012 | Larson | G06F 17/30575 707/703 |
| 2012/0166407 A1 | 6/2012 | Lee et al. | |
| 2012/0167098 A1 | 6/2012 | Lee et al. | |
| 2012/0310881 A1* | 12/2012 | Shadmon | G06F 17/30362 707/613 |
| 2013/0024422 A1* | 1/2013 | Konagolli Suresh | G06F 17/30578 707/634 |
| 2013/0124475 A1 | 5/2013 | Hildenbrand et al. | |
| 2013/0166534 A1 | 6/2013 | Yoon et al. | |
| 2013/0166553 A1 | 6/2013 | Yoon et al. | |
| 2013/0166554 A1 | 6/2013 | Yoon et al. | |
| 2013/0275457 A1 | 10/2013 | Lee et al. | |
| 2013/0275467 A1 | 10/2013 | Lee et al. | |
| 2013/0275468 A1 | 10/2013 | Lee et al. | |
| 2013/0275550 A1 | 10/2013 | Lee et al. | |
| 2013/0290282 A1 | 10/2013 | Faerber et al. | |
| 2013/0304714 A1 | 11/2013 | Lee et al. | |
| 2014/0122439 A1 | 5/2014 | Faerber et al. | |
| 2014/0122452 A1 | 5/2014 | Faerber et al. | |
| 2014/0136473 A1 | 5/2014 | Faerber et al. | |
| 2014/0136788 A1 | 5/2014 | Faerber et al. | |
| 2014/0149353 A1 | 5/2014 | Lee et al. | |
| 2014/0149368 A1 | 5/2014 | Lee et al. | |
| 2014/0149527 A1 | 5/2014 | Lee et al. | |
| 2014/0156619 A1 | 6/2014 | Lee et al. | |
| 2014/0222418 A1 | 8/2014 | Richtarsky et al. | |
| 2014/0244628 A1 | 8/2014 | Yoon et al. | |
| 2014/0297686 A1 | 10/2014 | Lee et al. | |
| 2014/0304219 A1 | 10/2014 | Yoon et al. | |
| 2015/0074082 A1 | 5/2015 | Yoon et al. | |
| 2015/0149409 A1 | 5/2015 | Lee et al. | |
| 2015/0149413 A1 | 5/2015 | Lee et al. | |
| 2015/0149426 A1 | 5/2015 | Kim et al. | |
| 2015/0149704 A1 | 5/2015 | Lee et al. | |
| 2015/0149736 A1 | 5/2015 | Kwon et al. | |
| 2015/0178343 A1 | 6/2015 | Renkes et al. | |
| 2015/0242400 A1 | 8/2015 | Bensberg et al. | |
| 2015/0242451 A1 | 8/2015 | Bensberg et al. | |
| 2015/0261805 A1 | 9/2015 | Lee et al. | |

OTHER PUBLICATIONS

Cha et al., "An Extensible Architecture for Main-Memory Real-Time Storage Systems", RTCSA : 67-73 (1996).

Cha et al., "An Object-Oriented Model for FMS Control", J. Intelligent Manufacturing 7(5): 387-391 (1996).

Cha et al., "Cache-Conscious Concurrency Control of Main-Memory Indexes on Shared-Memory Multiprocessor Systems", VLDB: 181-190 (2001).

Cha et al., "Efficient Web-Based Access to Multiple Geographic Databases Through Automatically Generated Wrappers", WISE : 34-41 (2000).

Cha et al., "Interval Disaggregate: A New Operator for Business Planning", PVLDB 7(13): 1381-1392 (2014).

Cha et al., "Kaleidoscope: A Cooperative Menu-Guided Query Interface", SIGMOD Conference : 387 (1990).

Cha et al., "Kaleidoscope Data Model for an English-like Query Language", VLDB : 351-361 (1991).

Cha et al., "MEADOW: A Middleware for Efficient Access to Multiple Geographic Databases Through OpenGIS Wrappers", Softw., Pract. Exper. 32(4): 377-402 (2002).

Cha et al., "Object-Oriented Design of Main-Memory DBMS for Real-Time Applications", RTCSA : 109-115 (1995).

Cha et al., "Paradigm Shift to New DBMS Architectures: Research Issues and Market Needs", ICDE: 1140 (2005).

Cha et al., "P*TIME: Highly Scalable OLTP DBMS for Managing Update-Intensive Stream Workload", VLDB: 1033-1044 (2004).

Cha et al., "Xmas: An Extensible Main-Memory Storage System", CIKM : 356-362 (1997).

Farber et al., SAP HANA Database: Data Management for Modern Business Applications. SIGMOD Record 40(4): 45-51 (2011).

Hwang et al., "Performance Evaluation of Main-Memory R-tree Variants", SSTD: 10-27 (2003).

Kim et al., "Optimizing Multidimensional Index Trees for Main Memory Access", SIGMOD Conference: 139-150 (2001).

Lee et al., "A Performance Anomaly Detection and Analysis Framework for DBMS Development", IEEE Trans. Knowl. Data Eng. 24(8): 1345-1360 (2012).

Lee et al., "Differential Logging: A Commutative and Associative Logging Scheme for Highly Parallel Main Memory Databases", ICDE 173-182 (2001).

Lee et al., "High-Performance Transaction Processing in SAP HANA", IEEE Data Eng. Bull. 36(2): 28-33 (2013).

Lee et al., "SAP HANA Distributed In-Memory Database System: Transaction, Session, and Metadata Management", ICDE 1165-1173 (2013).

Park et al., Xmas: An Extensible Main-Memory Storage System for High-Performance Applications. SIGMOD Conference : 578-580 (1998).

Sikka et al., "Efficient Transaction Processing in SAP HANA Database: The End of a Column Store Myth", SIGMOD Conference : 731-742 (2012).

Yoo et al., "A Middleware Implementation of Active Rules for ODBMS", DASFAA : 347-354 (1999).

Yoo et al., "Integrity Maintenance in a Heterogeneous Engineering Database Environment", Data Knowl. Eng. 21(3): 347-363 (1997).

Aulbach et al., "Extensibility and Data Sharing in Evolving Multi-Tenant Databases," in 2011 IEEE 27th International Conference on Data Engineering. IEEE, pp. 99-110 (2011).

(56) References Cited

OTHER PUBLICATIONS

Bailis et al., "Hat, Not Cap: Towards Highly Available Transactions", in Proceedings of the 14th USENIX Conference on Hot Topics in Operating Systems, pp. 24, USENIX Association (2013).
Bailis et al., "Scalable Atomic Visibility with Ramp Transactions," in Proceedings of the 2014 ACM SIGMOD International Conference on Management of Data. ACM, pp. 27-38 (2014).
Barber et al., "In-Memory Blu Acceleration in IBM's db2 and dashdb: Optimized for Modem Workloads and Hardware Architectures," in Proceedings of the 2015 International Conference on Data Engineering (ICDE). IEEE (2015).
Berenson et al., "A Critique of Ansi SQL Isolation Levels," ACM SIGMOD Record, vol. 24, No. 2, pp. 1-10, (1995).
Bernstein et al., "Concurrency Control and Recovery in Database Systems," (1987).
Bernstein et al., "Optimizing Optimistic Concurrency Control for Tree-Structured, Log-Structured Databases," in Proceedings of the 2015 ACM SIGMOD International Conference on Management of Data. ACM, pp. 1295-1309 (2015).
Chang et al., "Bigtable: A Distributed Storage System for Structured Data," ACM Transactions on Computer Systems (TOCS), vol. 26, No. 2, p. 4, (2008).
Chaudhuri et al., "An Overview of Data Warehousing and OLAP Technology," ACM Sigmod Record, vol. 26, No. 1, pp. 65-74 (1997).
Cooper et al., "Pnuts: Yahoo!'s Hosted Data Serving Platform," Proceedings of the VLDB Endowment, vol. 1, No. 2, pp. 1277-1288 (2008).
DeCandia et al., "Dynamo: Amazon's Highly Available Key-Value Store," ACM SIGOPS Operating Systems Review, vol. 41, No. 6, pp. 205-220 (2007).
DeWitt et al., "Parallel Database Systems: the Future of High Performance Database Systems," Communications of the ACM, vol. 35, No. 6, pp. 85-98 (1992).
Diaconu et al., "Hekaton: SQL Server's Memory-Optimized OLTP Engine," in Proceedings of the 2013 ACM SIGMOD International Conference on Management of Data. ACM, pp. 1243-1254 (2013).
Du et al., "Clock-Si: Snapshot Isolation for Partitioned Data Stores Using Loosely Synchronized Clocks," in Reliable Distributed Systems (SRDS), 2013 IEEE 32nd International Symposium on. IEEE, pp. 173-184 (2013).
Farber et al., "The SAP HANA Database—An Architecture Overview." IEEE Data Eng. Bull., vol. 35, No. 1, pp. 28-33 (2012).
Fekete et al., "Making Snapshot Isolation Serializable," ACM Transactions on Database Systems (TODS), vol. 30, No. 2, pp. 492-528 (2005).
Kallman et al., "Hstore: A High-Performance, Distributed Main Memory Transaction Processing System," Proceedings of the VLDB Endowment, vol. 1, No. 2, pp. 1496-1499 (2008).
Kemper et al., "Hyper: A Hybrid OLTP & OLAP Main Memory Database System Based on Virtual Memory Snapshots," in Data Engineering (ICDE), 2011 IEEE 27th International Conference on. IEEE, pp. 195-206 (2011).
Kung et al., "On Optimistic Methods for Concurrency Control," ACM Transactions on Database Systems (TODS), vol. 6, No. 2, pp. 213-226 (1981).
Lahiri et al., "Cache Fusion: Extending Shared-Disk Clusters with Shared Caches," in VLDB, vol. 1, pp. 683-686 (2001).
Lahiri et al., "Oracle Timesten: An In-Memory Database for Enterprise Applications." IEEE Data Eng. Bull., vol. 36, No. 2, pp. 6-13 (2013).
Larson et al., "High-Performance Concurrency Control Mechanisms for Main-Memory Databases," Proceedings of the VLDB Endowment, vol. 5, No. 4, pp. 298-309, (2011).
Neumann et al., "Fast Serializable Multi-Version Concurrency Control for Main-Memory Database Systems," in Proceedings of the 2015 ACM SIGMOD International Conference on Management of Data. ACM, pp. 677-689 (2015).
Pandis et al., "Dataoriented Transaction Execution," Proceedings of the VLDB Endowment, vol. 3, No. 1-2, pp. 928-939 (2010).
Plattner, H., "A Common Database Approach for OLTP and OLAP Using an In-Memory Column Database", in Proceedings of the 2009 ACM SIGMOD International Conference on Management of Data, pp. 1-2. ACM (2009).
Qiao et al., "On Brewing Fresh Espresso: Linkedin's Distributed Data Serving Platform," in Proceedings of the 2013 ACM SIGMOD International Conference on Management of Data. ACM, pp. 1135-1146 (2013).
Roy et al., "The Homeostasis Protocol: Avoiding Transaction Coordination Through Program Analysis," in Proceedings of the 2015 ACM SIGMOD International Conference on Management of Data. ACM, pp. 1311-1326 (2015).
Tu et al., "Speedy Transactions in Multicore In-Memory Databases," in Proceedings of the Twenty-Fourth ACM Symposium on Operating Systems Principles. ACM, pp. 18-32 (2013).
Vogels, W., "Eventually Consistent," Communications of the ACM, vol. 52, No. 1, pp. 40-44 (2009).
Weikum et al., "Transactional Information Systems: Theory, Algorithms, and the Practice of Concurrency Control and Recovery," (2001).
Zamanian et al., "Locality-Aware Partitioning in Parallel Database Systems," in Proceedings of the 2015 ACM SIGMOD International Conference on Management of Data. ACM, pp. 17-30 (2015).

* cited by examiner

SYNCHRONIZATION ON REACTIVATION OF ASYNCHRONOUS TABLE REPLICATION

CROSS REFERENCE TO RELATED APPLICATIONS

This application claims the benefit of, and incorporates by reference, U.S. Provisional Patent Application Ser. Nos. 62/182,405, 62/182,408, and 62/182,409, each filed Jun. 19, 2015.

FIELD

The present disclosure generally relates to replication of information. Particular implementations relate to asynchronous replication of data between a source and a replica in a database environment.

BACKGROUND

Database performance can be enhanced by creating a replica of a source table. For example, the replica may be hosted on a different computing system, with different processors. Having replicas available to service database read requests can help balance computing loads among multiple processors, improving system performance. Challenges in replicated systems include maintaining consistency between the source table and the replica table. Inconsistency can result, for example, when synchronization is restarted after a manual pause or system exception. Replication can also result in reduced system performance if the overhead associated with replication is too high.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for performing replication (e.g., replication of database information as modified by insert, update, and/or delete database operations) using data manipulation language (DML) statements within a database environment. In one aspect, DML-based replication of database data can be performed using DML statements and write logs (e.g., by sending write logs to replica nodes) for transactions with DML statements executed at multiple source nodes. The database system precommits each operation within a transaction and orders DML statements in write logs based on the source node where the operations are executable. The transaction is committed after each of its component operations has been precommitted. Precommitted operations are viewable by log replayers on a replica node. However, DML statements, even if precommitted, are not viewable to external readers until the entire transaction is committed.

In another aspect, the present disclosure provides for DML-based replication of data where the data is replicated to multiple replicas, or where records accessed by a transaction are distributed among a plurality of replica nodes. In one disclosed method, a transaction coordinator is selected from a plurality of replica nodes associated with a database transaction. Each replica node precommits DML operations occurring at that replica node after the operation is executed and transmits a precommit notification to the transaction coordinator. When the transaction coordinator receives precommit notifications from all involved replica nodes, the transaction coordinator commits the transaction and provides a postcommit notification to the involved replica nodes, including an identifier associated with committing the transaction, such as a timestamp. The replica nodes commit the transaction when they receive the postcommit notification.

In a further aspect, the present disclosure provides for improved consistency when resuming replication. In a particular method, replay of replication logs is blocked. In parallel, a plurality of source tables are locked, marked for replication resumption, and a timestamp acquired. The source tables are then unlocked. A plurality of replica tables are synchronized with the source tables based on the timestamp. When all of the replica tables have been synchronized, replication log replay is resumed.

As described herein, a variety of other features and advantages can be incorporated into the technologies as desired.

DETAILED DESCRIPTION

Example 1

Overview

Figure 1:
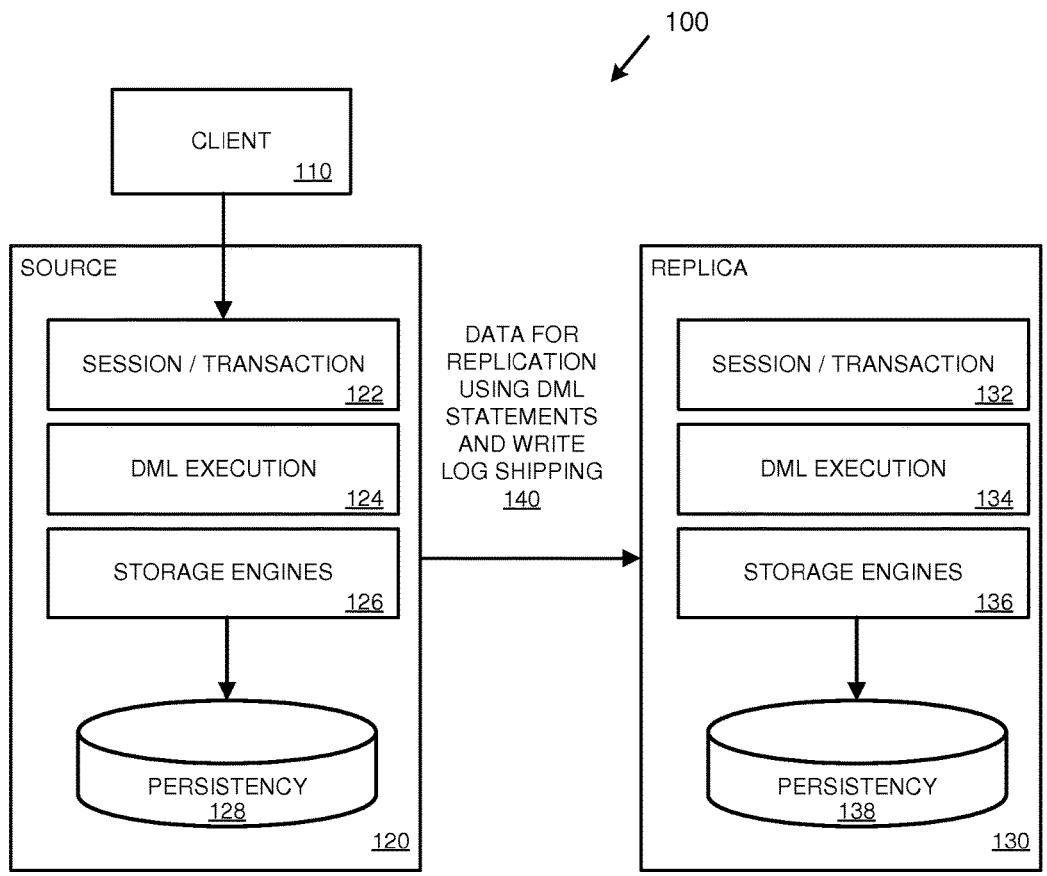
FIG. 1 is a diagram of an environment supporting replication using DML statements and write log shipping.

The following description is directed to techniques and solutions for performing replication of data (e.g., database data). For example, efficient replication of database data can be performed using data manipulation (DML) statements and write log shipping. As used herein, a DML statement refers to any statement, command, message, or other instruction that specifies any manipulation (e.g., insert, update, delete, select) of data. In some implementations, DML statements are executed (e.g., at a first database system) and write logs are created reflecting the DML statements and transaction commit operations. In one example, a separate write log entry is created for each DML statement or transaction commit operation. In a specific example, a write log entry can include a DML statement and associated parameters and/or values (e.g., parameters and/or values that may be needed when the DML statement is executed at another database system). The write logs entries can be inserted into a write log queue and sent to one or more other database systems for execution. In this way, database data can be replicated between a first database system (e.g., a source host or a source system distributed among multiple source nodes) and one or more other database systems (e.g., a replica system having a replica host or being replicated among multiple replica nodes).

As used herein, a source system refers to a database system (e.g., one or more computing devices implementing a database environment) from which database information (e.g., one or more database tables, an entire database, or other selection of database information) is replicated to other systems. A host refers to a computing system having a processor and memory. In some cases, a source system can include multiple hosts, typically referred to as nodes. However, unless the context clearly indicates otherwise, a node can refer to the host in a single host system, or one of a plurality of hosts in a system. A master node refers to a source node that manages information regarding the master node and one or more slave nodes. A slave node refers to a source node that is installed on a different host than the master source node.

Tables (e.g., database tables) can be replicated to multiple nodes (e.g., database nodes) in a scale-out system. This feature can provide scalable search throughput by leveraging multiple cores in multiple nodes beyond the limitation of a single machine. It can also reduce network traffic when joins are performed on multiple tables which are located on multiple nodes by providing more localized access. In a specific example, data replication can improve performance of a database system for both online analytical processing (OLAP) queries and operations and online transaction processing (OLTP) transactions and queries.

However, a performance penalty can occur when DML statements are replicated in a synchronous manner (e.g., when a DML statement is executed on a source system and a replica system within the same transaction boundary, where execution on all nodes must complete before the transaction is committed). In some cases, the penalty can be reduced, which achieves the benefits of scale-out, through asynchronous replication. In asynchronous replication, a transaction is committed when the DML statements in the transaction are committed at the source system, and the changes are propagated to the replica system outside the transaction boundary.

As used herein, a replica system refers to a database system that replicates database information (e.g., replicates one or more database tables, an entire database, or other selection of database information) from a source system, such as a single source host or a source system distributed among multiple source nodes. In some examples, the replica system may include a single replica host. In other examples, the replica system includes a plurality of replica nodes, which may store multiple copies of database tables maintained at the source system, have source database tables distributed across a plurality of replica nodes, or combinations thereof. In yet further examples, a single table may be distributed among multiple source hosts and/or may be distributed among multiple replica nodes.

Example 2

Write Logs

In any of the examples herein, DML statements (e.g., DML structured query language (SQL) statements) can be replicated using write logs. For example, a write log format can be created that comprises a DML statement with additional information associated with the DML statement (e.g., additional information for use when the DML statement is executed). In some implementations, a write log entry comprises a single DML statement.

In some implementations, a write log entry comprises a transaction identifier (ID), a DML statement, parameter values, and nondeterministic values. The transaction identifier identifies (e.g., uniquely identifies) the DML replication transaction. For example, the transaction identifier can uniquely identify the DML replication transaction that occurs on the source system and one or more replica nodes where the DML statement will be executed.

The DML statement can be a statement used to modify (e.g., add, update, and/or delete) data. For example, the DML statement can be a SQL statement used to modify data in a database. In some implementations, the DML statement is a SQL insert, update, or delete statement (e.g., a single SQL insert, update, or delete statement).

Parameter values are values used by the DML statement. For example, the parameter values can be values for binding to variables in the DML statement (e.g., a prepared or precompiled DML SQL statement). When the DML statement is executed (e.g., replayed), bind variables can be replaced with their corresponding parameter values. For example, if a DML statement contains a variable "NAME", the variable can be replaced with a specific string value when the DML statement is executed (e.g., the variable "NAME" can be replaced with a specific value, such as "John").

Nondeterministic values refer to values that may be different between different computing devices (e.g., different between source nodes and replica nodes). For example, a timestamp function will return a current timestamp value when run on the source system, which may be a different timestamp value when run at a later time on the replica system. In implementations where the same value is to be used for such nondeterministic functions, the nondeterministic function can be evaluated once (e.g., on the source system) and the resulting value can be provided in the logical log to the replica system so that when the DML statement is executed on the replica system the same value will be used (the same value that was used at the source system). For example, the nondeterministic function (e.g., current timestamp function) can be evaluated at the source system during DML statement execution and the resulting value can be sent in a write log entry to the replica system for use when executing the DML statement at the replica system.

In some implementations, a write log entry is the set of shipped values to perform replication of data at a replica location (e.g., a replica node) using a DML statement. In a specific implementation, the write log entry consists of:
  Transaction ID
  DML SQL statement
  Parameter values: values of bind variables (labeled '?') in prepared statement
  Nondeterministic values: If the SQL statement includes nondeterministic functions, such as sequence or CURRENT_TIMESTAMP function, evaluated values of the nondeterministic functions are included As used herein, the terms "ship" or "send" to a destination entity refer to any way of transmitting or otherwise conveying data within a computer system or between two computer systems, whether the data is directly conveyed or through one or more intermediate entities. Similarly, the term "receive," such as to receive from a source entity, refers to the receipt of data within a computer system or between two computer systems, whether the data is received directly from the computer system of original transmission or received through one or more intermediate entities.

As described above, write log entries can include information regarding other features of a database transaction. In one aspect, the write log includes entries for when a transaction is committed by the source system. For example, a transaction may include multiple DML statements. In one implementation, the transaction is committed when all of the DML statements in the transaction have been executed on the source system. The write log may include additional entries, such as individual DML statements within the transaction being precommitted on the source system, as will be further described below.

Example 3

Environment Providing Replication using DML Statements

In any of the examples herein, technologies can be provided for more efficient replication (e.g., replication of database information) using DML statements and write logs. For example, DML statements can be executed at a source system and incorporated into write logs for sending (shipping) to a replica system for execution to replicate data between the source system and the replica system for one or more database tables. Additionally, DML replication can be applied to different types of storage engines, such as row stores, column stores, etc.

In some implementations, the concept of DML replication (e.g., DML synchronous replication) with write log shipping is intended to perform replication across multiple nodes with minimum replication overhead. However, synchronous replication can result in longer response times, as both the source and replica(s) are updated in the same transaction boundary. Asynchronous replication, where the replica is not necessarily updated in the same transaction boundary, can allow for the use of a replica system while improving the response time for write transactions at the source system. However, asynchronous replication involves a risk that a read request on the replica system may return information that is outdated compared to the source table.

FIG. 1 is a diagram 100 illustrating database data replication using DML statements and write log shipping. As depicted in the diagram 100, a client 110 (e.g., a client computing device) communicates with a source system 120 (e.g., one or more server computers operating a database at which data will be modified and replicated to a replica system). For example, the client 110 can perform database manipulation operations (e.g., insert data, change data, and/or delete data in one or more database tables stored at the source system 120).

The source system 120 includes a number of components, including a session/transaction component 122, a DML execution component 124, and storage engines 126 (e.g., row-store and/or column-store storage engines). The storage engines 126 store database data in a persistency store 128 (e.g., hard disk drives, solid-state drives, and/or other types of persistent storage).

The source system, 120 can receive data manipulation operations (e.g., operations to add, modify, and/or delete data, such as in the form of insert, update, and/or delete DML statements) from the client 110 and/or from other clients or sources. Upon receiving the data manipulation operations (e.g., via the session/transaction component 122), the source system 120 can execute DML statements to perform the data manipulation operations (e.g., via the DML execution component 124). The source system 120 can also create write log entries incorporating the DML statements and send them (as depicted at 140) to a replica system 130 for execution.

The replica system 130 can receive the write logs and execute the entries contained within, including DML statements (e.g., along with other parameters, values, and/or other associated information in the logical logs), transaction commit operations, and DML statement precommit operations. For example, the replica system 130 can include components similar to the source system 120 (e.g., session/transaction component 132, DML execution component 134, storage engines 136, and persistency store 138). The replica system 130 can replicate database information stored at the source system 120 (e.g., one or more database tables) via DML statements (e.g., so that database data changes at the source system 120 are replicated to the replica system 130). In some cases, the replica system 130 can execute the DML statements and return results to the source system 120. Results can be provided to the source system 120 and/or to the client 110.

Figure 2:
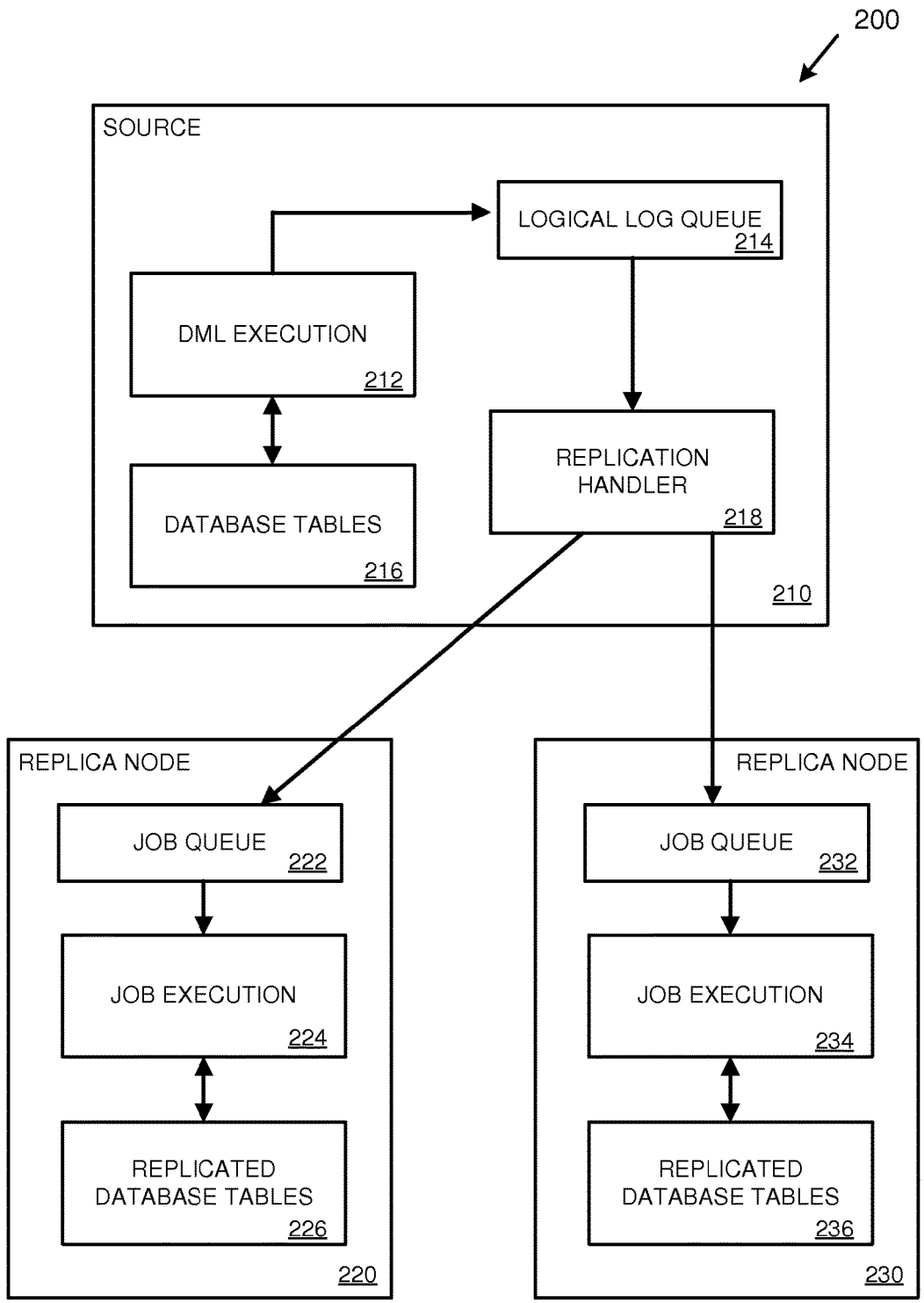
FIG. 2 is a diagram depicting a database environment for performing replication of database tables using DML statements and write log shipping.

FIG. 2 is a diagram depicting an example database environment 200 for performing replication of database tables using DML statements and write log shipping. The database environment 200 includes a number of replica nodes 220, 230 among which database tables 216 are replicated.

As depicted in the database environment 200, a source system 210 (e.g., a source host or a source node) comprises a number of components supporting database activity and replication. Specifically, the source system 210 stores database tables 216 (e.g., in one or more persistent storage repositories). The source system 210 includes a DML execution component 212 that executes DML statements that read and/or write database data in the database tables 216. The source system 210 also includes a write log queue 214 for storing write logs and a replication handler 218 for sending write logs to other database nodes (e.g., to replica nodes 220 and/or 230).

In order to replicate database tables (e.g., to replicate the database information stored in one or more database tables so that the database tables remain synchronized between database nodes), the DML execution component 212 of the source system 210 can receive a DML statement (e.g., originally from a user or from another source) and execute the DML statement on one of the database tables 216 (e.g., to add, modify, and/or delete data in the database table, which can be called a primary table). The DML execution component 212 can then create a write log entry (which includes the DML statement) and insert the write log entry into the write log queue 214. Once the write log entry has been inserted into the write log queue 214, the DML execution component 212 can be free to handle other DML requests (e.g., the DML execution component 212 does not have to wait for the write log entry to be replicated to the replica nodes 220, 230 before performing other DML operations).

In some implementations, the DML execution component 212 includes a number of threads of execution, where each thread can work independently to handle DML requests. In such an implementation, a thread can execute a DML statement, create a write log entry (which includes the DML statement), insert the write log entry into the write log queue 214, and be free to handle other requests without having to wait for replication of the DML statement to be completed (e.g., for the DML statement to be sent to other nodes or for results of DML statement execution at the other nodes).

In some implementations, the DML execution component 212 determines parameter values and/or nondeterministic values used by the DML statement when executing the DML statement in relation to the database table. In such implementations, the DML execution component 212 can include the parameter values and/or nondeterministic values in the write log entry with the DML statement. The DML execution component 212 can also include a transaction identifier in the write log entry to identify the replication transaction. The DML execution component 212 orders the DML statements for execution such that any given DML statement is not executed until the underlying data it affects is ready. For example, an update statement for a record is not executed until after an insert statement adding the record. The DML execution component 212 can modify information (e.g., in non-deterministic values or row-ID values that act as state counters) indicating how to serialize DML statements in the write log entries.

The source system 210 also comprises a replication handler 218 for handling write log entries in the write log queue 214. The replication handler 218 can take write logs from the write log queue 214 and send them to one or more replica nodes (e.g., node 220 and/or node 230) in order for the replica nodes to perform replication by executing the DML statements contained within the write log entries. For example, the replication handler 218 can retrieve a write log entry from the write log queue 214 and send the write log entry to node 220 and/or to node 230. The write log entry can pass through various internal or external structures, queues, etc., when it is routed to the replica nodes.

A replica node receiving a write log entry, such as replica node 220, can receive the logical log entry and insert it into a job queue 222. Reception of the write log entry by replica node 220 can be performed by a separate component (e.g., a write log receiver component, not pictured) or by the job queue 222. Once the write log entry has been received and inserted into the job queue 222, a job execution component 224 can retrieve the write log entry and execute the DML statement contained within (e.g., along with parameter values and/or nondeterministic values, if present) on one of the replicated database tables 226. Other replica nodes can also receive the write log entry from the replication handler 218 (e.g., node 230, with its own job queue 232, job execution component 234, and replicated database tables 236).

In some implementations, database tables can be replicated on a node-by-node basis. For example, a source system (e.g., source system 210) can store a full set of database tables while a first replica node (e.g., node 220) may replicate some or all of the tables stored at the source system and a second replica node (e.g., node 230) may also replicate some or all of the tables stored at the source system. Furthermore, each replica node may replicate the same tables as one or more other replica nodes, or may replicate different tables from one or more other replica nodes. As an example, source system 210 may store database tables 1, 2, and 3. Replica node 220 may replicate database tables 1 and 2. Replica node 230 may replicate database tables 1 and 3.

In some implementations, a write log entry that contains a DML statement modifying a particular database table is sent to replica nodes that replicate the particular database table (e.g., only to those replica nodes that replicate the particular database table and not to replica nodes that do not replicate the particular database table). For example, the replication handler 218 can send a write log entry from the write log queue 214 to replica nodes that replicate a database table being modified by the DML statement within the write log entry.

In some implementations, grouping of write log entries is performed. For example, multiple write logs entries that modify database tables replicated at a particular replica node can be grouped and sent to the particular replica node. Consider an example arrangement in which the source system 210 stores store database tables 1, 2, and 3, replica node 220 replicates database tables 1 and 2, and replica node 230 replicates database tables 1 and 3. In this example arrangement, if the write log queue 214 contains three write logs entries that all modify database information stored in database table 1, then the three write log entries can be grouped (e.g., combined into a write log group) and sent to both replica node 220 and replica node 230 which both replicate table 1. If the write log queue 214 contains two write logs entries that both modify database information stored in database table 3, then the two write log entries can be grouped and sent to replica node 230, which replicates database table 3 (and not to replica node 220, which does not replicate database table 3). If the write log queue 214 contains two write log entries that both modify database information stored in database table 1 and one write log entry that modifies database information stored in database table 2, then a first write log group can be created for sending all three write log entries to replica node 220 and a second write log group can be created for sending only the two write log entries that modify table 1 to replica node 230.

Write log grouping can be applied so that network resources are utilized more efficiently. For example, to minimize the penalty of replication, write log grouping can be used in which multiple write log entries for multiple clients are grouped into a single network communication. This technique can reduce network resource needed to perform replication and may increase DML execution throughput.

The job execution component of a replica node that receives write log entries can include a number of processes or threads for executing jobs in the job queue. For example, the job execution component 224 of replica node 220 can include a number of job execution threads that retrieve write log entries from the job queue 222 and execute them. In some implementations, the job execution threads can execute write log entries in parallel, which can increase efficiency. In dispatching write log entries, the job execution component 224 can use information (e.g., non-deterministic values or row-ID values that act as state counters) to control the timing of execution, so that any given DML statement is not executed until the underlying data it affects is ready.

Figure 3:
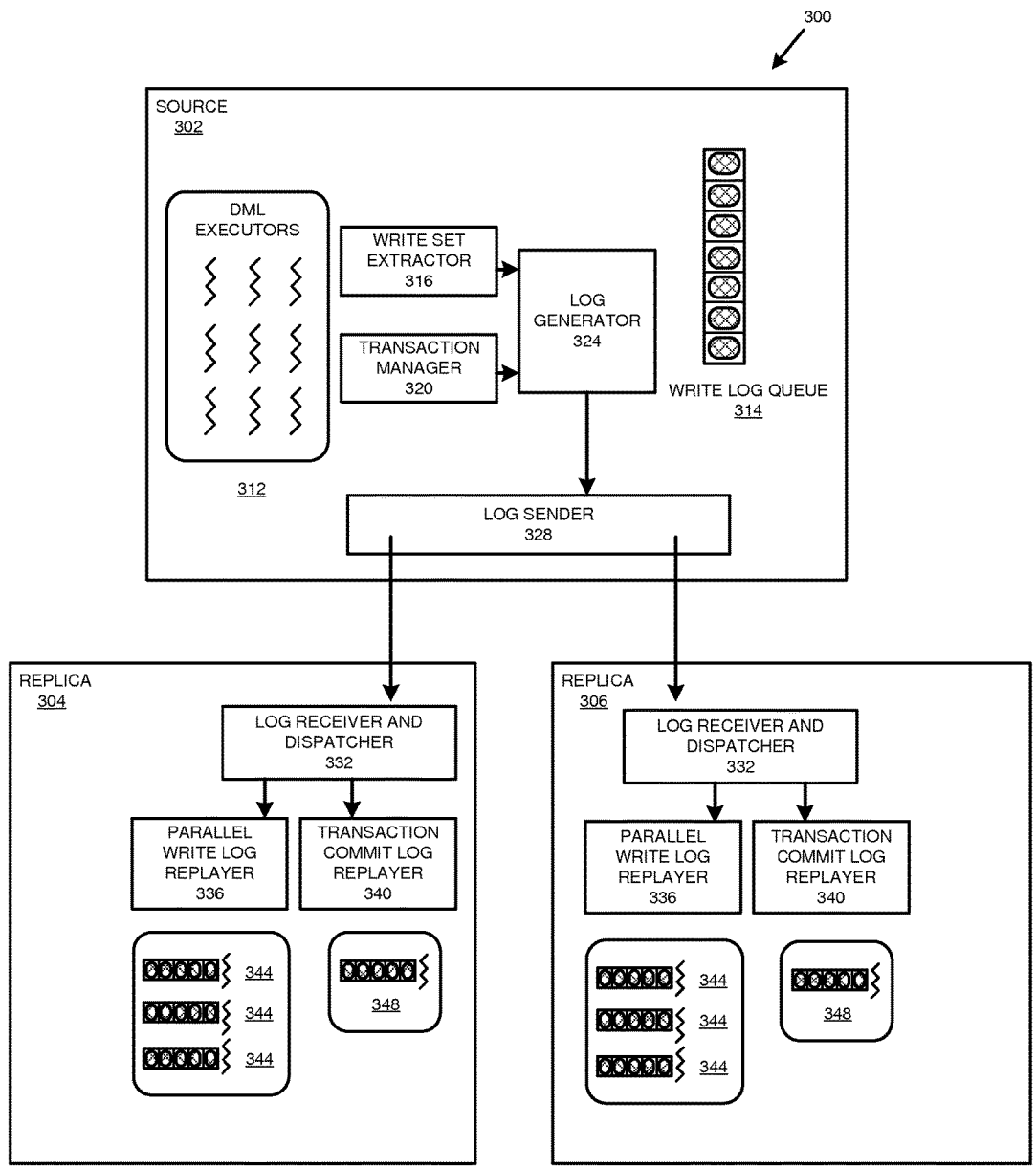
FIG. 3 is a diagram depicting a database environment for performing replication of database tables from a source node to replica nodes.

FIG. 3 is a diagram depicting a database environment 300 for performing replication of database tables from a source system 302, to a replica system having replica nodes 304, 306. While two replica nodes are depicted, replication of database tables can be performed between the source system 302 and any number of replica nodes.

As depicted in the example database environment 300, the source system 302 includes a number of DML executors 312 (threads of execution for handling DML requests). To support replication, a write set extractor 316 extracts appropriate DML information from the DML request. Similarly, a transaction manager 320 monitors transaction commit operations. Commit operations determine when the result of a transaction is available for reading. Read requests will receive the last committed version of a record, even if the record is currently being modified by a DML operation.

A log generator 324 communicates with the transaction manager 320 and the write set extractor 316. The log generator 324 generates logs entries for the write and commit operations and adds them to a write log queue 314. The write log queue 314 is emptied, and log entries are sent to appropriate replica nodes (e.g., through one or more intermediary nodes) by a log sender 328 that communicates with the log generator 324.

Each replica node 304, 306 includes a log receiver and dispatcher 332. The log receiver and dispatcher 332 receives the write log entries from the log sender 328. The log receiver and dispatcher 332 parses the log entries. Write operations are sent by the log receiver and dispatcher 332 to a parallel write log replayer 336, while commit operations are sent by the log receiver and dispatcher 332 to a transaction commit log replayer 340.

As shown in FIG. 3, the parallel write log replayer 336 includes multiple replayers 344 that can operate concurrently. This structure helps improve system performance by allowing multiple write operations on the replicated table to be carried out simultaneously, in the absence of dependencies between the write operations. In at least some implementations, write logs associated with the same transaction are replayed by the same replayer 344 in the same order that the operations occurred at the source node.

In order to help ensure consistency between the source system 302 and the replica nodes 304, 306, the transaction commit log replayer operates serially, such as with a single replayer 348. Also, the log receiver and dispatcher 332 can use information provided with write log entries to order write operations appropriately, honoring dependencies between write operations.

As described above, because each replica node 304, 306 can replicate one or more database tables independently of other replica nodes, in some implementations each replica node 304, 306 only receives and executes write logs for database tables replicated by the replica node.

In at least some implementations of a database system, the write log entries sent to the replica nodes 304, 306 may execute transactions in a different order than the transactions occurred at the source system 302, while honoring dependencies between operations in write log entries (e.g., using row-ID values as state counters). However, the transaction commit log replayer 340 serially replays commit transactions in the same order in which they occurred at source system 302, helping to maintain consistency between the source system 302 and the replica nodes 304, 306.

At least certain implementations of the present disclosure include an additional feature that helps maintain consistency in the system 300. That is, each replicated table has associated with it a row-ID generator. The value of the row-ID generator is incremented each time a write (change) operation is performed on a record within the table. The value is copied to a row-ID column of the database record being changed. When the write log entries are generated by the log generator (324, FIG. 3), the information is used in the write log entries.

For example, operations inserting a new record will include information for the (new, incremented) row-ID of the inserted record. Operations updating a record will result in the write log including information for the row-ID of the record prior to the write operation and the incremented row-ID after the write operation. Delete operations will include information for the row-ID of the deleted row. As will be further described below, the use of the unique row-ID can assist both in replicating data on an ongoing basis, and when replication is resumed, such as due to manual intervention or a system exception.

Example 4

Figure 4:
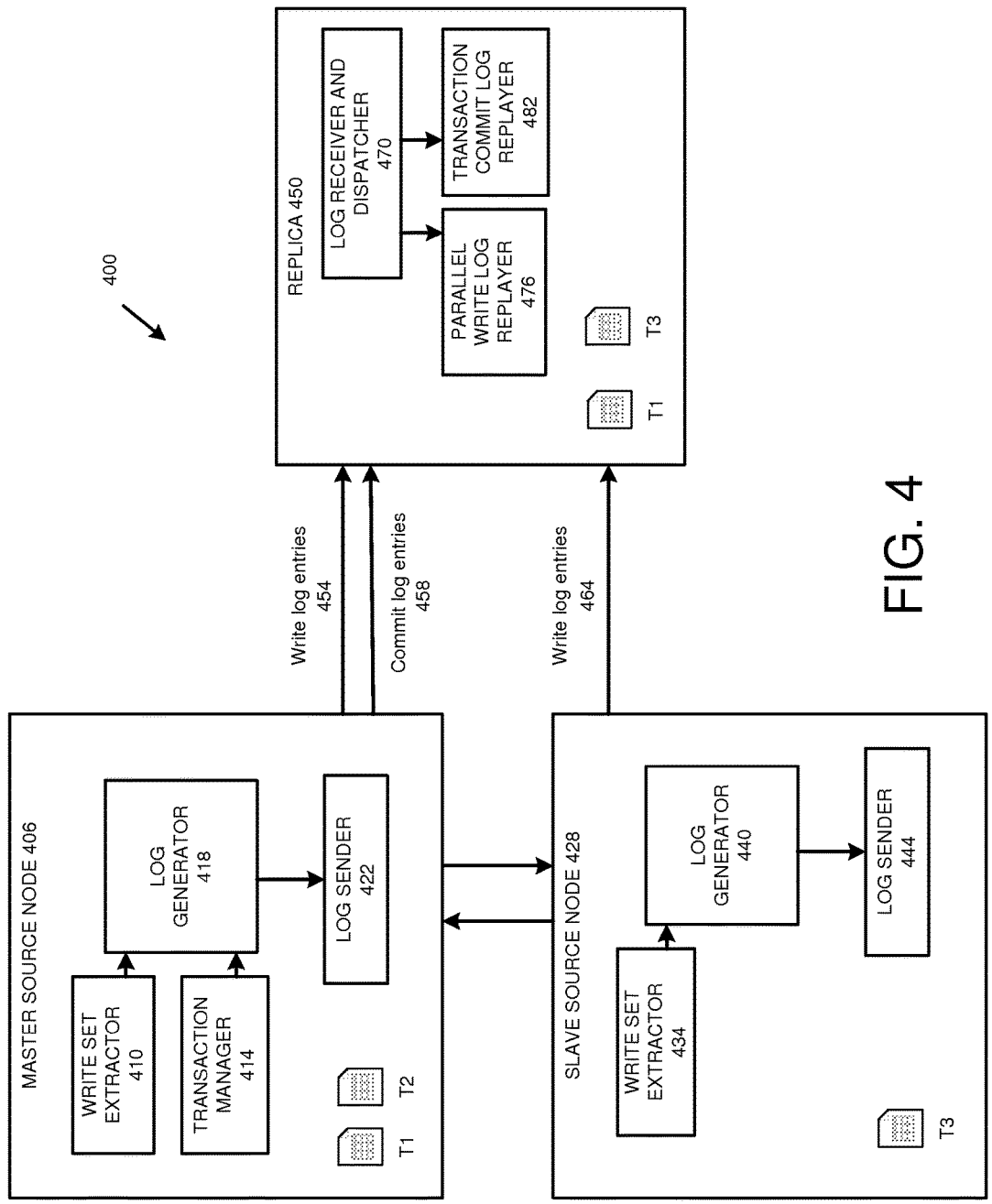
FIG. 4 is a diagram depicting a database environment for performing replication from a master source node and a slave source node to a replica.

Environment Providing Replication from Source Tables Distributed Across Multiple Source Nodes FIG. 4 illustrates a topology where a database system 400 is distributed among multiple source nodes 406, 428. In one aspect, the system 400 builds on the system described in Example 3.

As shown, the system 400 includes a master source node 406, which directly hosts tables T1 and T2. The master source node 406 includes a write set extractor 410, which in some examples is configured in an analogous manner as described for the write set extractor 316 of FIG. 3. The master source node 406 includes a transaction manager 414, which may be configured in an analogous manner as described for the transaction manager 320 of FIG. 3. The master source node 406 further includes a log generator 418 and a log sender 422, which may be configured in an analogous manner as described for the log generator 324 and the log sender 328 of FIG. 3.

The system 400 further includes a slave source node 428, which hosts table T3. The slave source node 428 includes a write set extractor 434, a log generator 440, and a log sender 444, which may be configured in an analogous manner as described for the write set extractor 316, log generator 324, and log sender 328 of FIG. 3.

In one implementation of the system 400, the write set extractor 410 and log generator 418 generate write logs for tables T1 and T2 hosted on master source node 406 and send them to a replica system, such as a replica host 450 via the log sender 422. The write set extractor 434 and log generator 440 generate write logs for Table T3 hosted on slave source node 428 and send them to the replica 450 via the log sender 444.

Source nodes 406 and 428 communicate with each other. For example, they may exchange information or instructions regarding committed transactions. In at least one example, the master source node 406 manages transaction commits for the tables hosted on both source nodes 406 and 428 and sends them to the replica 450 via the transaction manager 414, log generator 418, and log sender 422.

The replica 450 communicates with the source node 406. For example, as described above, the source node 406 may send the replica 450 write logs 454 and transaction commit logs 458. The replica 450 is also shown as being in communication with the source node 428. The source node 428 may send the replica write logs 464.

The replica 450 includes a log receiver and dispatcher 470, a parallel write log replayer 476, and a transaction commit log replayer 482, which may be configured in a manner analogous to the log receiver and dispatcher 332, parallel write log replayer 336, and transaction commit log replayer 340 of FIG. 3.

The log receiver and dispatcher 470 receives log entries of write logs 454 and log entries of commit logs 458 from master source node 406, and log entries of write log 464 from slave source node 428. The log receiver and dispatcher 470 parses incoming logs and sends log entries for DML operations and precommit operations to the parallel write log replayer 476. The log receiver and dispatcher 470 sends entries for transaction commit operations to the transaction commit log replayer 482. In at least one example, write log entries from write logs 454 and 464 are sent independently, and time order is only preserved within log entries from a single source node 406, 428. However, transaction commit entries in the transaction log commit log replayer 482 are processed serially in the order they were committed at the source nodes 406, 410.

It should be appreciated that certain implementations may include variants of the topology shown in system 400. For example, the system 400 may include multiple replica hosts or nodes, which each may replicate the same or different tables from one or more of the master source node 406 and the slave source node 428. In further examples, a single table from one of the master source node 406 and the slave source node 428 is partially replicated at each of a plurality of replica nodes, where the replica nodes, taken together, replicate the entire table.

In another aspect, the components of the system 400 communicate in a manner other than as shown in FIG. 4. For example, transaction commit logs may be sent by either of the source nodes 406, 428, or may be sent by node 428 rather than node 406, as shown, depending on which source node is the master source node for a given transaction. In another example, write logs are only sent by one of source node 406 and source node 428.

In other implementations, the write logs are generated and sent, or received and handled by, a component at the source nodes 406, 428 or the replica 450, other than as described above.

The present disclosure provides a method for ensuring that write and commit operations distributed among multiple source nodes 406, 428 do not give rise to a deadlock situation where a transaction is unable to be fully committed. Table 1 provides an example of operations executed on a database system organized as shown in FIG. 4.

TABLE 1

Transaction Executed at Source System

| Execution sequence number at Source | Operation |
|---|---|
| 1 | Transaction 1: Insert Row 10 into Table 1 |
| 2 | Transaction 1: Commit (Node 1 Transaction) |
| 3 | Transaction 2: Insert Row 20 into Table 3 |
| 4 | Transaction 2: Update Row 10 => Row 11 on Table 1 |
| 5 | Transaction 2: Commit (Nodes 1 and 2 Transactions) |
| 6 | Transaction 3: Update Row 20 => Row 21 on Table 3 |
| 7 | Transaction 3: Commit (Node 2 Transaction) |

As shown in Table 1, Transaction 2 depends on Transaction 1, since Transaction 2 updates the row that was inserted in Transaction 1. Similarly, Transaction 3 depends on Transaction 2, since Transaction 3 modifies a row that was inserted in Transaction 2. In this example, the operations involving Table 1 are performed on one source node and the operations involving Table 3 are performed on another source node. Each source node sends write log entries for the operations that it performs. When multiple changes relate to the same multi-node source transaction, propagation of write log entries for those changes is unordered, which can create a deadlock problem.

Table 2 illustrates a DML replayer queue that may be generated from the transactions in Table 1.

TABLE 2

DML Replayer Queue Corresponding to Transactions in Table 1

| DML log replayer | Note |
|---|---|
| Transaction 2: Insert Row 20 into Table 3 | Replayable (no dependency) |
| Transaction 3: Update Row 20 => Row 21 on Table 3 | Only replayable after Transaction 2 commits |
| Transaction 1: Update Row 10 into Table 1 | Only replayable after previous logs replayed |
| Transaction 2: Update Row 10 => Row 11 on Table 1 | |

As shown in Table 2, the replay schedule at a replica node can depend on delays in processing or sending DML log entries (e.g., it can depend on the source node responsible for sending DML log entries or it can depend on routing mechanisms used). Although DML time log order is preserved within operations executed at a single source node, at the replica node, DML log entries from different source nodes can be intermixed, which can lead to conflicting dependencies between operations and the potential for a deadlock situation to occur.

Table 3 provides an example transaction commit log replayer queue that may be constructed from the transactions of Table 1.

TABLE 3

Transaction Commit Log Replayer Queue

| Transaction log replayer | Note |
| --- | --- |
| Transaction 1 Commit | Waiting for Transaction 1: Insert Row 10 into Table 1 |
| Transaction 2 Commit | Waiting for: Transaction 2: Insert Row 20 into Table 3 Transaction 2: Update Row 10 => Row 11 on Table 1 |
| Transaction 3 Commit | Waiting for Transaction 3: Update Row 20 => Row 21 on Table 3 |

As shown in Table 2, only the first DML log entry (first part of Transaction 2) is replayable, because the DML log entry for Transaction 1 is blocked by the DML log entry for Transaction 3, which cannot be executed until Transaction 2 is committed (which depends on execution of the DML log entry for the rest of Transaction 2, which depends on Transaction 1 being committed). Thus, there is a deadlock that prevents further operations from being carried out and committed.

In one aspect, the present disclosure provides a method of handling this deadlock problem by changing how multi-node source transactions are replicated. Basically, the method splits a multi-node source transaction into multiple smaller, single-node replayer transactions that each represent operations performed at a single source node. For example, a four-node source transaction is split into four single-node replayer transactions. This approach can eliminate dependencies among write operations in the same multi-node source transaction, thereby avoiding deadlock problems.

The method is described with reference to methods 500 and 550 of FIGS. 5A and 5B. Method 500 describes operations that are implemented at least in part by a first source node, such as a master source node. Method 550 describes operations that are implemented at least in part by a replica node.

In method 500, in step 510, at least a first DML statement for a multi-node source transaction is received by a first node, such as a master source node, in a database system having a source system that includes the first source node. The DML statement is executable at the first source node. The source system further includes a second source node, such as a slave source node, and a replica system that includes a replica node. The multi-node source transaction includes at least a second DML statement executable at the second source node.

In a specific implementation, the transactions are precommitted during transaction execution at the source system. For example, in step 520, the at least a first DML statement in the transaction is executed at the first source node. At step 530 the transaction is precommitted, as to the at least a first DML transaction, at the first source node. The DML statement for the slave source node is also executed and precommitted at the second source node. A precommit log entry is similar to a commit log entry but can apply to one part of a multi-node source transaction, where that part is executed at a single source node. In a specific example, precommit log entries are generated by the write set extractors 410, 434 and log generators 418, 440, and transmitted by the log senders 422, 444, in an analogous manner as described with reference to FIG. 4 for write operations occurring at the master source node 406 or the slave source node 428 and commit operations occurring at the master source node 406.

In more specific implementations, a precommit log entry may include information in addition to the fact that a DML statement was executed, such as a timestamp. In a particular example, the timestamp is associated with when the precommit operation occurred. During replication, when an operation is precommitted, it is made available to write log replayers, such as parallel write log replayer 476 (FIG. 4). However, the changes are not viewable to other database readers until the entire transaction is committed. In an aspect of the present disclosure, the entire transaction is committed once every component DML statement has been executed and precommitted.

In some cases, a single-node replayer transaction includes all of the DML statements for a multi-node source transaction executable at a particular node. In other cases, a single-node replayer transaction includes less than all of the DML statements at a particular node for the multi-node source transaction. For example, multiple single-node replayer transactions may be used to represent multiple single-node DML statements executable at a particular source node. Typically, when multiple single-node transactions are used to represent single-node DML statements in a multi-node source transaction, an identifier is provided to the multiple single-node transactions to indicate that they are all part of the same multi-node source transaction. When one single-node transaction is used for multiple DML statements at the node, the single-node transaction may include one or more indications that the constituent DML statements have been precommitted. For example, one indication of precommitted status may represent the overall single-node transaction, rather than individual DML statements within the transaction. When multiple single-node transactions are used for multiple DML statements occurring at a single node in a multi-node source transaction, each of the single-node transactions, in one example, includes an indication that the particular DML statement has been precommitted.

According to a particular implementation, the write logs are formatted for use by DML log and/or transaction commit log replayers 476, 482 on the replica node 450, in ways analogous to how they are formatted to represent single-node replayer transactions. For example, the formatting may be carried out by the log generator 418. In another implementation, the replica node 450 formats the write logs as replayer transactions, such as with the log receiver and dispatcher 470 or the parallel write log replayer 476.

Using the same transactions as in Table 1, but precommitting each DML statement, the operations carried out at the source nodes 406, 428 are provided in Table 4. In this example, write and precommit operations involving a first table (Table 1) are performed at one source node (first source node) and write operations involving a second table (Table 3) are performed at another source node (second source node). Transaction commit operations are performed at the master source node for a transaction.

TABLE 4

Example Operations at Source System Including Precommits

| Execution sequence number at Source | Operation |
| --- | --- |
| 1 | Transaction 1: Insert Row 10 into Table 1 |
| 2 | Transaction 1: Precommit Node 1 Transactions |
| 3 | Transaction 1: Commit Node 1 Transaction |
| 4 | Transaction 2: Insert Row 20 into Table 3 |

TABLE 4-continued

Example Operations at Source System Including Precommits

| Execution sequence number at Source | Operation |
|---|---|
| 5 | Transaction 2: Precommit Node 2 Transactions |
| 6 | Transaction 2: Update Row 10 => Row 11 on Table 1 |
| 7 | Transaction 2: Precommit Node 1 Transactions |
| 8 | Transaction 2 Commit (Nodes 1 and 2 Transactions) |
| 9 | Transaction 3: Update Row 20 => Row 21 on Table 3 |
| 10 | Transaction 3: Precommit Node 2 Transactions |
| 11 | Transaction 3: Commit (Node 2 Transaction) |

The transactions occurring at the source nodes 406, 428 are typically entered in a write log, as previously described. For example, the transactions may be processed by the write set extractor 410 and the log generator 418. A write log is typically created that includes the DML statements in the transaction. In one implementation, the write log also includes entries for precommit operations. The write log may also include entries for commit operations.

A component of a database system, such as a source system or a replica system, analyzes each transaction for individual DML operations that are carried out at different source nodes. If the transaction includes DML statements that occur at multiple nodes, the transaction is split by the component into multiple single-node transactions, ordered by the node on which the DML statements were executable. If desired, the transactions for each node may be further ordered, such as ordering the transactions by timestamp or commit order. Once the transactions are reordered, in step 540, statements are output for single-node replayer transactions that correspond to the at least the first DML statement and the precommitting of the transaction as to the at least the first DML statement. In specific examples, the reordering is carried out by the log generator 418 of FIG. 4. In further examples, the reordering is carried out at the replica node 450, such as by the log receiver and dispatcher 470 or the write log replayer 476. In yet further examples, the reordering is carried out by another component, or by more than one component.

The write log also includes precommit entries for each DML statement, again ordered by the node on which the precommit occurred. Table 5 illustrates a DML log replayer queue after transactions have been reordered by the node on which the individual DML operations occurred. Node 2 transactions are correctly ordered relative to other Node 2 transactions and Node 1 transactions are correctly ordered relative to other Node 1 transactions. Node 1 transactions can be arbitrarily reordered relative to Node 2 transactions. Thus, the relative ordering of DML statements from a given source table is maintained, but ordering of DML statements between difference source nodes need not be maintained.

TABLE 5

DML Replayer Queue with DML Statements and Precommits Ordered by Node

| DML log replayer | Note |
|---|---|
| Transaction 2: Insert R20 Into Table 3 | Replayable (no dependency) |
| Transaction 2: Precommit Node 2 Transactions | Insert Row 20 is now visible to Transaction 3 |
| Transaction 3: Update Row 20 => Row 21 on Table 3 | Node 2 changes are now considered to be committed to other replayer - replayable |
| Transaction 3: Precommit Node 2 Transactions | |
| Transaction 1: Insert Row 10 into Table 1 | Replayable |
| Transaction 1: Precommit Node 1 Transactions | Insert Row 10 is now visible to Transaction 2 |
| Transaction 2: Update R10 => R11 on Table 1 | Replayable |
| Transaction 2: Precommit Node 1 Transactions | |

Although Table 5 illustrates a single DML queue, in some implementations a database system may implement multiple DML queues. In one such example, the database system, such as the log receiver and dispatcher 470, forwards log entries from the same transaction to the same DML queue, and thus the method 500 of FIG. 5A can be applied. In at least certain implementations, write logs associated with the same transaction are replayed by the same replayer, in the same order the actions occurred at the source node (although, the order of actions between different source nodes need not be preserved, at least in some examples).

In step 560 of method 550, the replica node receives and buffers, as entries in a write log, at least a first DML statement for a first single-node replayer transaction that corresponds to a first part of a multi-node source transaction. The replica node receives and buffers, as entries in a write log, at least a second DML statement for a second single-node replayer transaction that corresponds to a second part of the multi-node source transaction in step 570. The replica node can also receive and buffer, as entries in the write log, at least a first precommit statement (for the first single-node replayer transaction) and at least a second precommit statement (for the second single-node replayer transaction). In step 580, the buffered entries in the write log are replayed on the replica node. For example, the replica node replays DML statements and precommit statements. When replayed, the DML statements in the write log are ordered by the source node on which the DML statement was executable.

In some aspects of the present disclosure, transaction commit operations are received and buffered in a transaction log, and then replayed at the replica system, such as by the transaction commit log replayer 482 of FIG. 4. For the reordered transactions described in Table 5, a corresponding transaction commit replayer queue is provided in Table 6.

TABLE 6

Transaction Commit Log Replayer Queue Corresponding to DML Replayer Queue Having DML Statements Reordered by Node and Precommit Operations

| Transaction log replayer | Note |
|---|---|
| Transaction 1 Commit | Replayable after Transaction 1: Precommit |
| Transaction 2 Commit | Replayable after Transaction 2: Precommit Node 1 and Node 2 |
| Transaction 3 Commit | Replayable after Transaction 3: Precommit |

Figure 5:
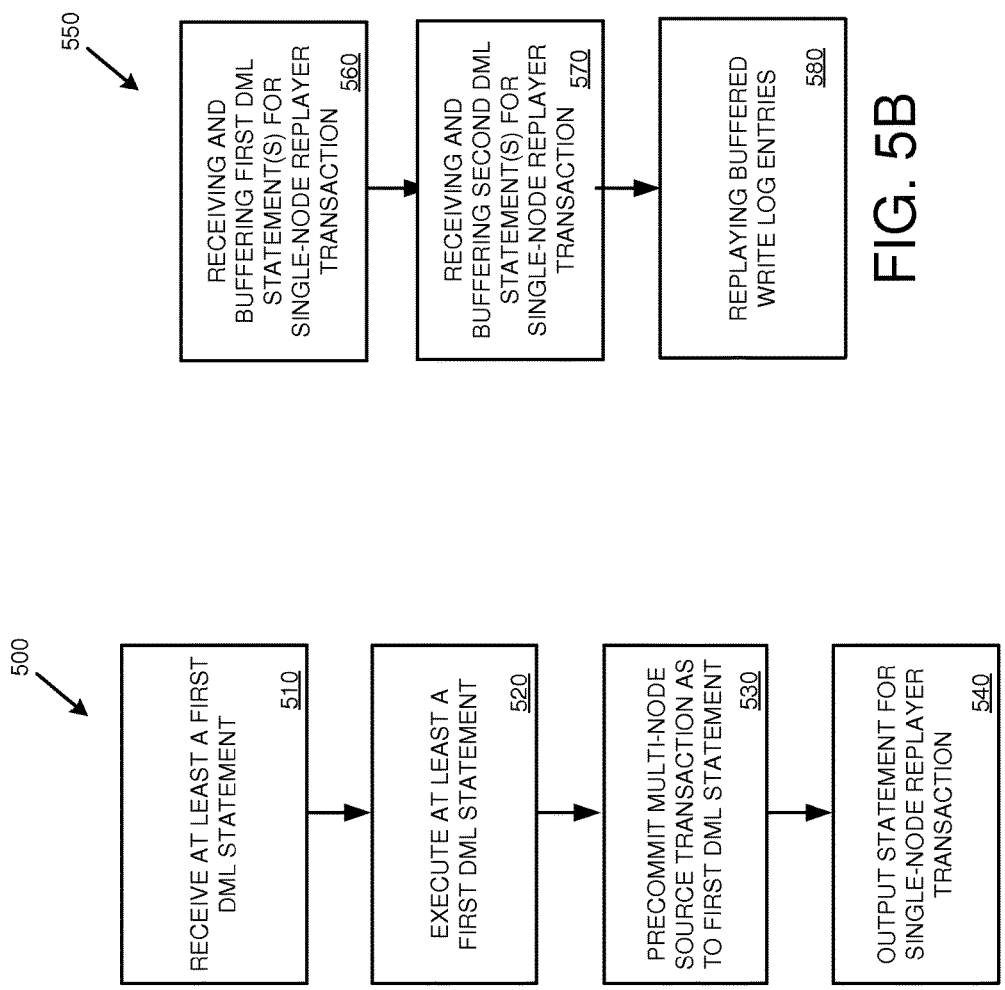
FIG. 5A is a flowchart of an example method involving a source node for performing replication within a database environment involving transactions having DML operations distributed across multiple source nodes.
FIG. 5B is a flowchart of an example method involving a replica node for performing replication within a database environment involving transactions having DML operations distributed across multiple source nodes.

In a particular implementation of the method 550 of FIG. 5B, once a transaction is committed by the transaction commit log replayer, a single commit timestamp is assigned to the transaction, and the transaction becomes available to external readers. Thus, the transaction commit log is processed to set synchronization points of actual transaction boundaries.

In one aspect, a database system implementing the system of FIG. 4 orders data updates by locking individual database records. If two transactions depend on one another, the later transaction will wait for the first transaction to commit before executing. However, using the method of FIGS. 5A and 5B, the lock waiting situation for write operations will only happen inside each discrete source node, rather than having the waiting situation depend on a lock release for a write operation on a different source node. Using the method of FIGS. 5A and 5B, lock transaction dependency only needs to be managed on a source node-by-source node basis for write operations executed at the respective source nodes.

The methods 500 and 550 can provide additional advantages. For example, they can improve the overall performance of the database system. Rather than having to wait for a transaction to be fully committed before being read by a replayer, the individual DML statements can be read by the replayer as soon as the operation is precommitted. Also, because the transactions are ordered by source node, more replayers are able to operate in parallel, thus further reducing the time needed to replicate changes.

Example 5

Figure 6:
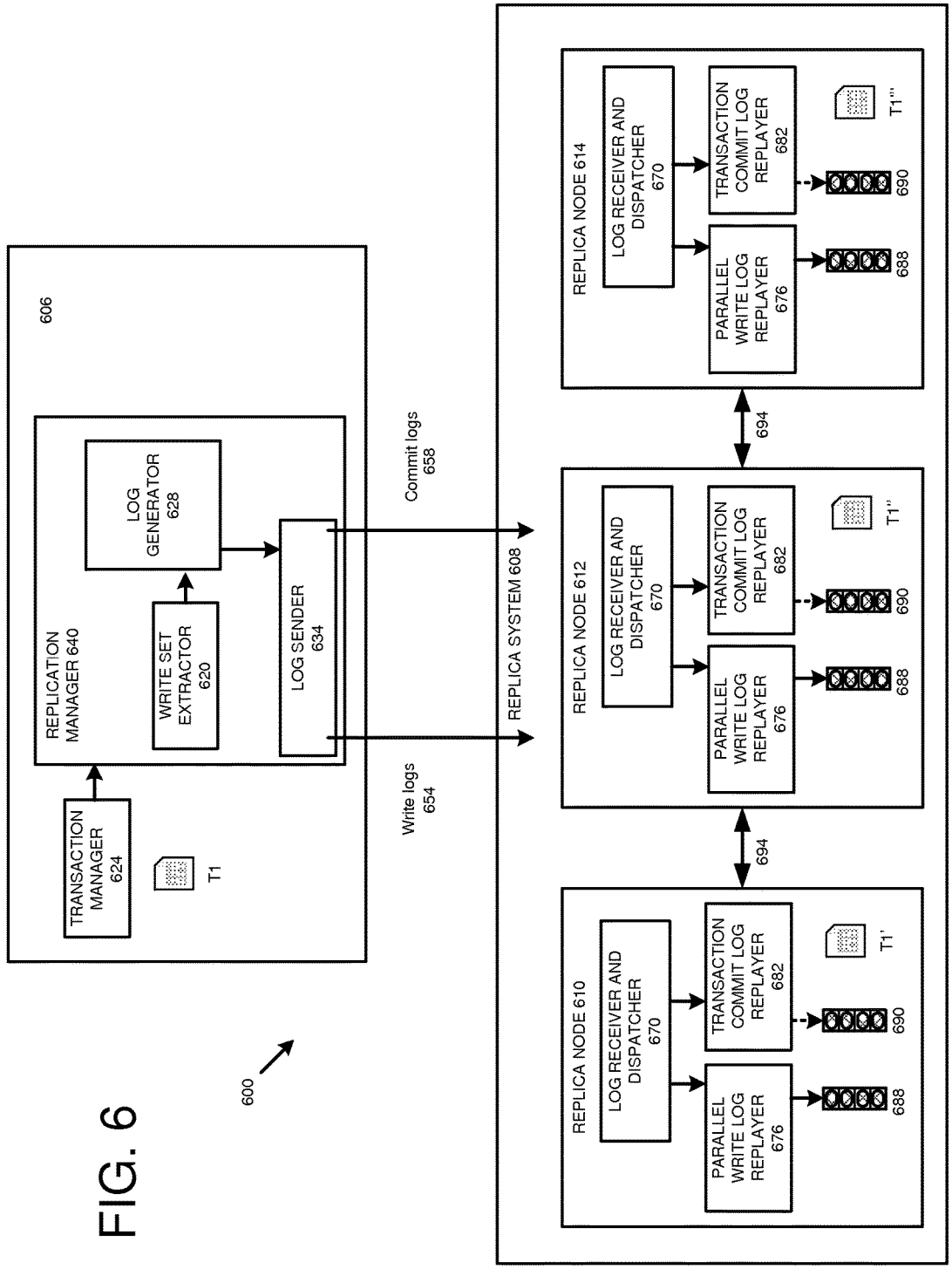
FIG. 6 is a diagram depicting a database environment for performing replication from a source system to a replica system having multiple replica nodes.

Environment Providing Replication from a Source System to Multiple Replica Nodes FIG. 6 illustrates a database system topology 600 having a source system 606 (shown as at a single host) and a replica system 608 having a plurality of replica nodes 610, 612, 614. The source system 606 hosts a table T1, which is replicated at replica node 610 as table T1', at replica node 612 as table T1", and at replica node 614 as table T1'". Alternatively, the replica system includes some other number of replica nodes.

Source node 606 includes a write set extractor 620, a transaction manager 624, a write log generator 628, and a write log sender 634, which, in one aspect of the present disclosure, are configured in an analogous manner as write set extractor 316, transaction manager 320, log generator 324, and log sender 328 of FIG. 3. Each replica node 610, 612, 614 includes a log receiver and dispatcher 670, a parallel write log replayer 676, and a transaction commit log replayer 682, which may be configured in a manner analogous to the log receiver and dispatcher 332, parallel write log replayer 336, and transaction commit log replayer 340 of FIG. 3.

Source node 606 also includes a replication manager 640. The replication manager 640 assists in coordinating updates among replica nodes 610, 612, 614, as will be further described. The replication manager 640 is typically in communication with the transaction manager 624. For example, the transaction manager 624 may provide the replication manager 640 with a commit ID extracted from a transaction occurring at the source system 606.

As shown in FIG. 6, the replication manager 640 includes the write set extractor 620, the write log generator 628, and the write log sender 634. However, the replication manager 640 may be configured differently. For example, in some implementations the replication manager 640 may include additional components, or may lack one or more, including all, of the write set extractor 620, the write log generator 628, and the write log sender 634. In further implementations, the replication manager 640 may be part of another component, such as the transaction manager 624, the write set extractor 620, the write log generator 628, or the write log sender 634. In another aspect, the replication manager 640 is located on another system, at a host intermediate the source system 606 and the replica system 608, or within the replica system 608. In yet another aspect, the replication manager 640 is distributed across the source system 606 and one or more of a replica system 608 and a host intermediate the source system 606 and the replica system 608.

In a particular implementation, the replication manager 640 includes a sender side located on the source system 606 (and which may be configured as described above), and a receiver side of the replication manager 640, which may be located, for example, at one or more of the replica nodes 610, 612, 614. According to at least one example, the receiver side of the transaction manager 640 includes one or more of the log receiver and dispatcher 670, the parallel write log replayer 676, and the transaction commit log replayer 682 of the respective replica node or nodes 610, 612, 614. In a further example, the receiver side of the transaction manager 640 includes additional components, or is implemented as part of another component, such as the log receiver and dispatcher 670, the parallel write log replayer 676, or the transaction commit log replayer 676.

Each replica node 610, 612, 614 includes a precommit notification queue 688 and a postcommit notification queue 690. Each replica node 610, 612, 614 inserts messages regarding execution of write operations into its respective precommit notification queue 688, such via its parallel write log replayer 676. A replica node 610, 612, 614 selected as a transaction coordinator, as will be further discussed, inserts postcommit messages into its postcommit notification queue 690. The replica nodes 610, 612, 614 exchange precommit and postcommit messages 694. For example, postcommit messages 694 inserted into the postcommit notification queue 690 by a replica node 610, 612, 614 selected as the transaction coordinator may be received by the log receiver and dispatcher 670 of the non-coordinator replica nodes 610, 612, 614. In at least certain implementations of the present disclosure, each replica node 610, 612, 614 includes both a precommit notification queue 688 and a postcommit notification queue 690. Non-coordinator replica nodes, in particular examples, do not use their postcommit notification queues 690 with respect to transactions for which the replica node is not the coordinator. In further examples, one or more of the replica nodes 610, 612, 614 may lack one or more of the precommit notification queue 688 and the postcommit notification queue 690.

Although the topology 600 may be beneficial in providing increased access to data and better balancing of processing demand, it can create the potential for inconsistent data retrieval if replica nodes independently replay incoming replication logs and locally commit them. For example, if a query Q1 accesses table T1' and a later query Q2 accesses table T1", it is possible that a record may be visible to Q1, but not Q2, even though Q2 was executed after Q1. This can happen, for example, if replication data is routed to, or processed, more slowly to replica node 612 than replica node 610. To address this problem, when replaying replication logs, replica nodes can synchronize with each other to provide a consistent transaction view across the replica nodes for incoming read access.

Figure 7A:
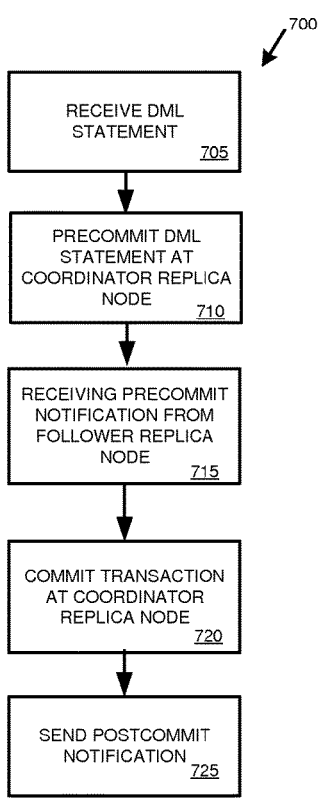
FIG. 7A is a flowchart of an example method involving a transaction coordinator replica node for performing replication within a database environment from a source system to a replica system having multiple replica nodes.
Figure 7B:
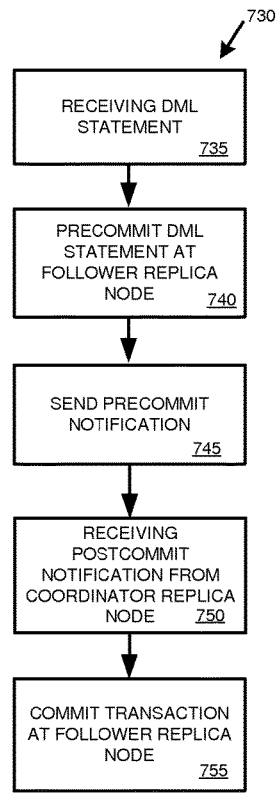
FIG. 7B is a flowchart of an example method involving a follower replica node for performing replication within a database environment from a source system to a replica system having multiple replica nodes.
Figure 7C:
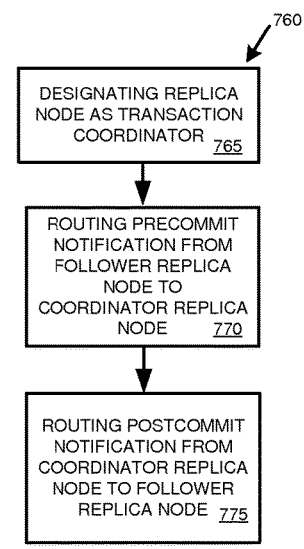
FIG. 7C is a flowchart of an example method involving a manager node for performing replication within a database environment from a source system to a replica system having multiple replica nodes.

FIGS. 7A-7C are flowcharts of example methods 700, 730, 760 for coordinating replication from a source system to a replica system including multiple replica nodes, and is described in conjunction with the system 600 of FIG. 6. Method 700 is implemented at least in part by a coordinator replica node, method 730 is implemented at least in part by a follower replica node, and method 760 is implemented at least in part by a manager node (e.g. replication manager 640).

A transaction including one or more DML operations is received at the source system 606. In particular implementations of the methods 700, 730, 760, the write set extractor 620 and transaction manager 624 communicate information regarding DML operations and transaction commits associated with the transaction to the write log generator 628.

One of the replica nodes 610, 612, 614 is selected as the transaction coordinator. In a particular implementation, the replication manager 640 performs this designation to select the transaction coordinator. In another aspect, the replica node 610, 612, 614 is randomly selected as the transaction coordinator. In other aspects, selection criteria may be applied in selecting one of the replica nodes 610, 612, 614 as the transaction coordinator. For example, the transaction coordinator may be designated as the replica node having the highest connectivity with other replica nodes or the source system, the highest available processing capacity, or be designated based on workload considerations (such as a replica node receiving a higher or lower number of read requests compared with other replica nodes). In other implementations, another component performs the designation of the transaction coordinator, such as another component of the source system 606, the replica system 608, or another system. For a particular transaction, replica nodes not selected as the transaction coordinator are referred to as follower replica nodes.

The source system 606, e.g. write log sender 634, sends write logs to the replica nodes 610, 612, 614. In some implementations, the source system 606 also sends the replica nodes 610, 612, 614 the identity of the transaction coordinator. In a further embodiment, each replica node 610, 612, 614 parses the write log, such as with its log receiver and dispatcher 670. Each respective write log and dispatcher 670 sends DML operation log entries to the parallel write log replayer 676 on its node. If the replica node is the node selected as the transaction coordinator, commit operations are forwarded to the transaction commit log replayer 682 of that node.

In step 705 of method 700, a DML statement, such as a DML statement associated with a transaction having one or more DML statements, is received by the transaction coordinator replica node. The DML statement is to be replicated at the coordinator replica node and one or more follower replica nodes. Therefore, one or more follower replica nodes also receive the DML statement, as shown in step 735 of method 730. DML logs are replayed by each node 610, 612, 614. After each transaction is executed on a node 610, 612, 614, the respective node precommits the transaction. For example, the DML statement is precommitted by the transaction coordinator replica node in step 710 of method 700, and by the follower replica node in step 740 of method 730. At this point, the follower replica node can continue to process DML statements for other transactions, without waiting for completion (final commitment) of the transaction associated with the precommitted DML statement.

When a follower replica node precommits the DML statement, it transmits a precommit notification to the transaction coordinator replica node in step 745 of method 730. In a specific example, the notification is added to the precommit notification queue 688. A component of the follower replica node, such as the parallel write log replayer 676, enqueues the precommit notification, or sends the precommit notification to be enqueued. The precommit notification queue may be, for example, a FIFO queue maintained at the follower replica node, coordinator replica node, or manager node. The precommit notification queue can be stored by multiple follower replica nodes, or different follower replica nodes can have their own precommit notification queues. A component of the coordinator replica node dequeues the precommit notification, or receives the dequeued precommit notification. The precommit notification is received by the transaction coordinator in step 715 of method 700. The coordinator replica node can receive the precommit notification(s) for a DML statement from the follower replica node(s) either before or after the coordinator node has itself executed and precommitted the DML statement.

The transaction coordinator monitors the precommit notification queue, or otherwise waits for receipt of precommit notifications (such as notifications received by the log receiver and dispatcher 670), to determine when all replica nodes 610, 612, 614 have precommitted the transaction. When the transaction has been precommitted by all of the replica nodes 610, 612, 614, and the coordinator replica node has itself precommitted the transaction, the transaction coordinator fully commits the transaction in step 720 of method 700. In step 725, the transaction coordinator sends a postcommit notification, such as a notification including a timestamp for the commit operation, to the other replica nodes 610, 612, 614. In a specific example, the notification is added to a postcommit notification queue 690. A component of the coordinator replica node, such as the transaction commit log replayer 682, enqueues the postcommit notification, or sends the postcommit notification to be enqueued. The postcommit notification queue may be, for example, a FIFO queue maintained at the coordinator replica node, follower replica node, or manager node. The postcommit notification queue 690 can be stored by multiple follower replica nodes, or different follower replica nodes can have their own precommit replica queues. A component of the follower replica node, such as the log receiver and dispatcher 670 or the transaction commit log replayer 682, dequeues the postcommit notification, or otherwise receives the dequeued postcommit notification.

In step 750 of method 730, the follower replica nodes 610, 612, 614 receive the postcommit notification. The nodes 610, 612, 614 then commit the transaction in step 755. In one implementation, the replica nodes commit the transaction using the timestamp provided by the transaction coordinator. At this point, readers will be able to access updated, consistent data at each of the replica nodes 610, 612, 614. Before the post commit notification is received (but after the precommit notification is sent), the transaction remains in doubt at the follower replica node (and thus not visible by external readers), but accessible for purposes of replay, such as by the parallel write log replayers 676 of the replica nodes 610, 612, 614.

In another aspect of the system 600 and methods 700, 730, 760, the replica nodes 610, 612, 614 assign a value, such as a latest timestamp, to the precommit operation and transmit the value to the transaction coordinator (e.g., as part of the precommit notification). In a particular example, when the transaction is committed by the transaction coordinator, the transaction coordinator assigns a timestamp to the committed transaction, and includes this postcommit timestamp value in the postcommit notification to the other replica nodes. In various examples, the value assigned as a timestamp to the committed transaction is a value based on the highest precommit notification value among the received precommit notification values (such as the highest precommit value incremented by one), the timestamp associated with committing the transaction at the source system, or the highest available timestamp (or the incremented value of the highest available timestamp, such as the value incremented by one) when the transaction is committed by the transaction coordinator. In a specific example, the transaction coordinator increments the highest snapshot value known to it, such as by one, and assigns this value to the committed transaction as the timestamp.

Method 760 of FIG. 7C illustrates operations occurring at a manager node. The manager node collects and broadcasts information to/from other replica nodes. In various implementations, the manager node is the transaction coordinator replica node, a follower replica node, a source node (such as a master source node or a slave source node), or another host. In step 765, the manager node selects a replica node 610, 612, 614 as the transaction coordinator replica node, such as in a manner described above. In step 770, the manager node routes a precommit notification from a follower replica node to a transaction coordinator replica node. The manager node routes a postcommit notification from the transaction coordinator replica node to a follower replica node in step 775. In this example, the manager node can maintain the precommit notification queue(s) and the postcommit notification queue(s). In other examples, the manager node is omitted, or performs more, fewer, or different functions. In a particular example, the manager node designates a replica node to function as the transaction coordinator, but does not mediate communications between the replica nodes 610, 612, 614.

Figure 8:
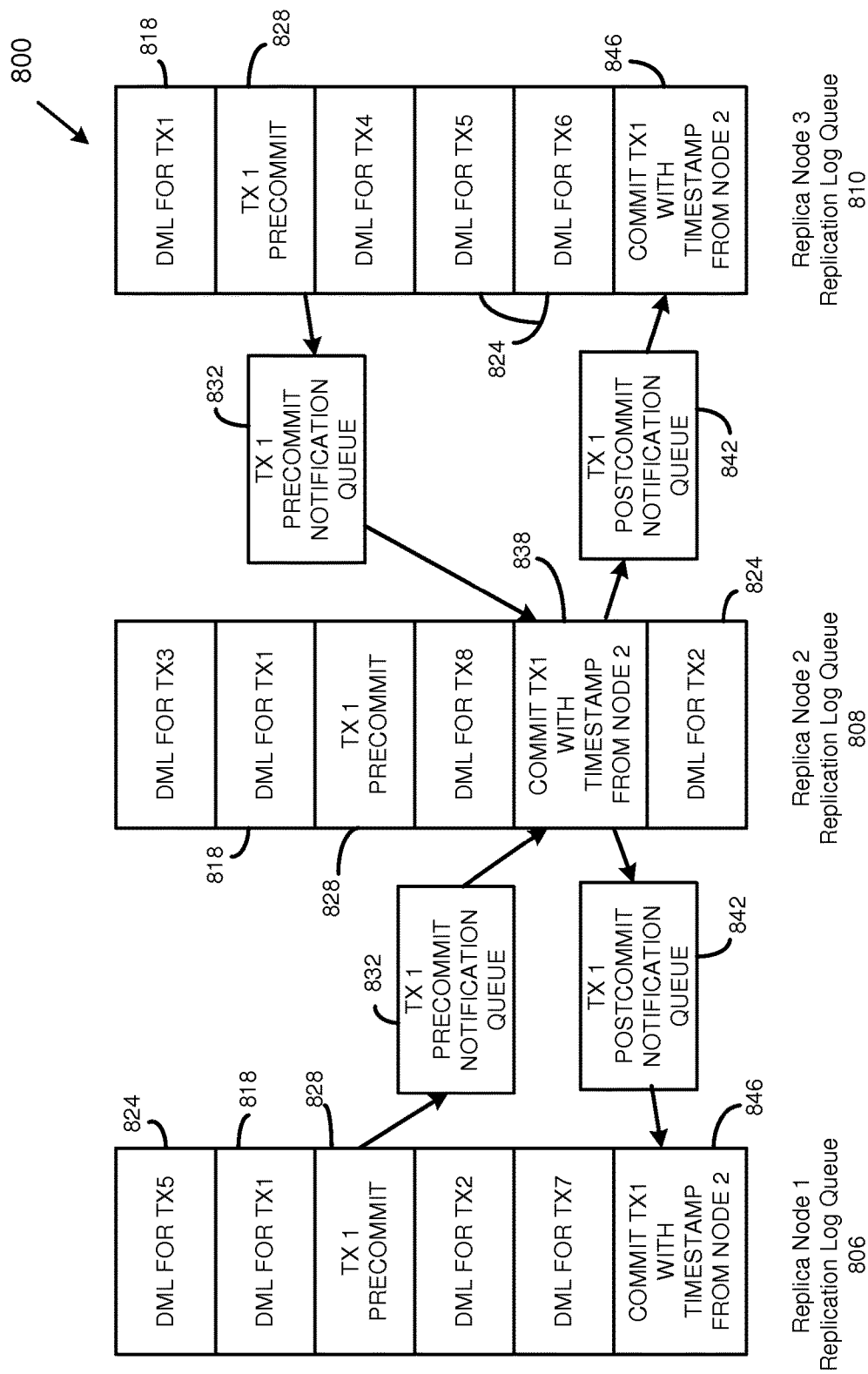
FIG. 8 is a diagram depicting transmission of precommit and postcommit notifications among replica nodes.

FIG. 8 provides a schematic diagram of an example of how the methods 700, 730, 760 of FIGS. 7A-7C may be carried out at three replica nodes, having replication log queues 806, 808, 810, respectively. Each replication log queue 806, 808, 810 includes a DML transaction 818 (for TX1) that is to be applied to a table having a replica maintained at all three nodes. The replication log queues 806, 808, 810 include a variety of other DML operations 824 (for TX2-TX8), some of which are unique to a particular node and others which are shared by multiple nodes. DML transaction 818 is shown as the single DML transaction common to all three nodes, and its processing by the three nodes is described in order to aid in understanding how the methods 700, 730, 760 of FIG. 7 may be applied. Other DML transactions shared by multiple nodes may be handled in an analogous manner, even though not shown on FIG. 8.

Each replica node includes a precommit operation 828 for DML transaction 818 after its execution in the respective queue 806, 808, 810. Once the transaction is precommitted by the replication log queue 806 for replica node 1, replica node 1 notifies the transaction coordinator, which is replica node 2 (having replication log queue 808), that the transaction is precommitted by replica node 1 through the precommit notification 832. In one example, the precommit notification is added to a precommit notification queue (such as by the parallel write log replayer 676 of FIG. 6). Similarly, when DML transaction 818 is precommitted at replication log queue 810 of replica node 3, replica node 3 notifies the transaction coordinator, replica node 2, that the transaction is precommitted through the precommit notification 832. Replica node 2 also precommits TX 1 after execution, as shown in log entry operation 828 of replication log queue 808.

Once the transaction coordinator, replica node 2, precommits DML transaction 818, and receives precommit notifications 832 from all other replica nodes that the transaction is committed at replica nodes 1 and 3, replica node 2 commits DML transaction 818 in operation 838 and assigns the transaction a timestamp. The transaction coordinator, node 2, then notifies replica node 1 and replica node 3 that transaction 1 should be committed using the timestamp sent from replica node 2 through the postcommit notifications 842. In one example, the postcommit notifications 842 are added to a postcommit notification queue 690, such as by the transaction commit log replayer 682 of the transaction coordinator node. Nodes 1 and 3 commit transaction 818 in operations 846.

Once DML transaction 818 is committed by execution of the commit in a respective replication queue 806, 808, 810, it is available for external readers. The data at each of the three nodes is consistent, and has a consistent timestamp. In example implementations, database snapshots are strictly ordered by transaction commit timestamp. Readers accessing data with the same timestamp get the same synchronized version of data. By using the same commit timestamp set by the coordinator replica node, reader anomalies (which might result if each replica node assigned a different commit timestamp) are avoided.

Thus, by using an asynchronous commit timestamp handshaking protocol (as described in this Example 5), multiple transactions that are meant to belong to the same snapshot boundary are synchronized to external readers, since they are derived from the same source table transaction. At the same time, during replay, sending a precommit notification/waiting for a postcommit notification does not block other replication log replay jobs. Each notification request can be queued and processed by a separate thread. Also, since a replayer can see other "in-doubt" transaction changes that have been precommitted, the replayer is not blocked, which can provide fast and efficient replayer performance.

Example 6

Figure 9:
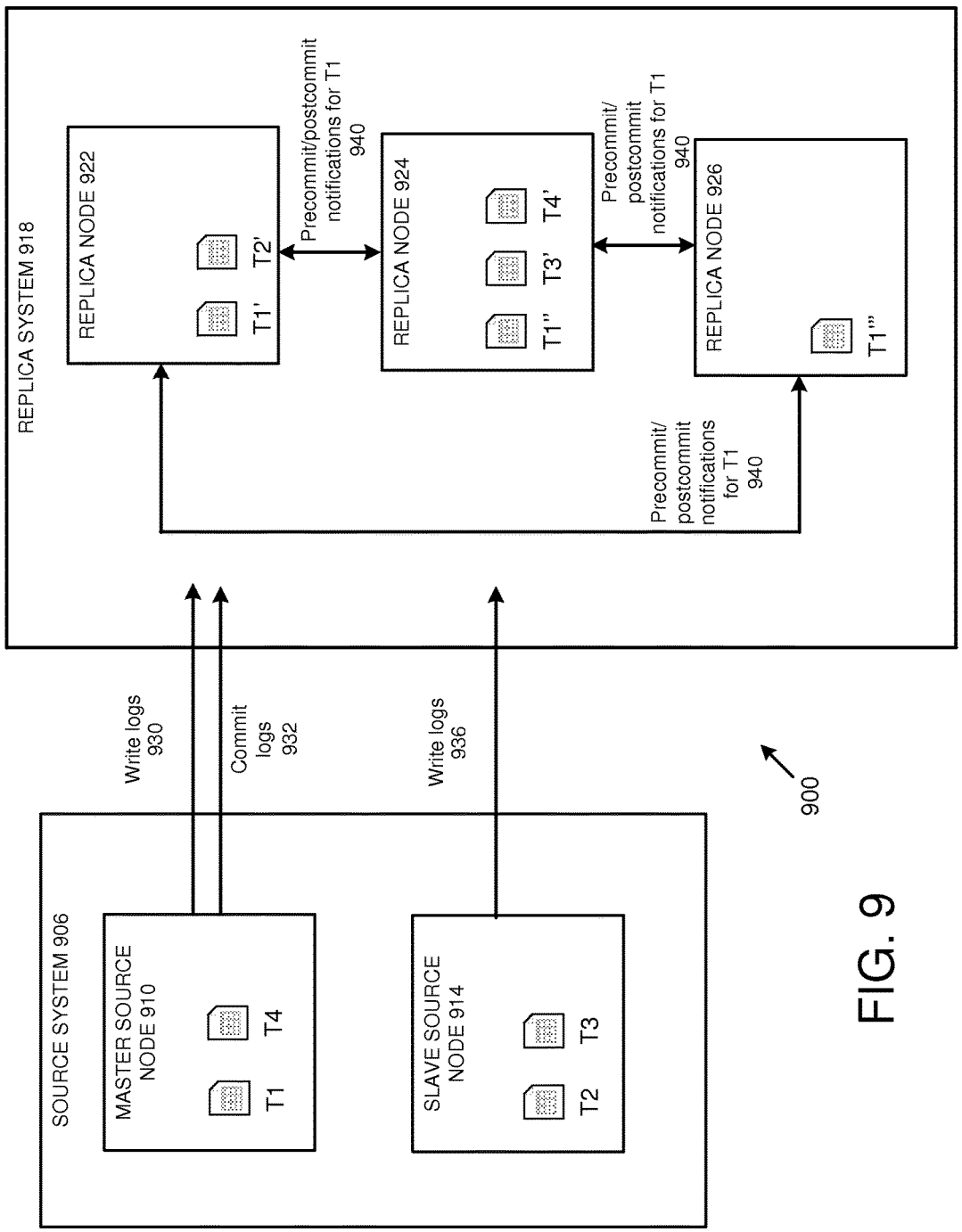
FIG. 9 is a diagram depicting a database environment for performing replication from a master source node and a slave source node to a replica system having a plurality of replica nodes.

Environment Providing Replication from Distributed Source to Multiple Replica Nodes Examples 4 and 5 of the present disclosure may be combined to allow for replication of tables distributed across multiple source nodes (such as a master source node and slave source nodes, as illustrated in FIG. 4) to multiple replica nodes (as shown in the example system 900 of FIG. 9).

FIG. 9 illustrates a system 900 that includes a source database system 906 having a master source node 910 hosting tables T1 and T4. A slave source node 914 hosts tables T2 and T3. The system 900 includes a replica system 918 having replica nodes 922, 924, 926. Replica node 922 hosts copies of tables T1 and T2. Replica node 924 hosts a second copy of table T1 and a copy of tables T3 and T4. Replica node 926 hosts a third copy of table T1. Table T1 is replicated at all three replica nodes 922, 924, 926, table T2 is replicated only at replica node 922, and tables T3 and T4 are replicated only at replica node 924.

Master source node 910 communicates with the replica system 918 by sending write logs 930 or commit logs 932 to any of replica nodes 922, 924, 926. Slave source node 914 communicates with the replica system 918 by sending write logs 936 to any of the replica nodes 922, 924, 926.

If a transaction on source system 906 includes DML operations for tables hosted on both master source node 910 and slave source node 914, and the tables are maintained at a single replica node, the transaction may be processed as described in Example 4. An example of such a transaction is one having DML operations for tables T3 and T4.

If the transaction includes DML statements occurring at a table located only one of master source node 910 and slave source node 914, but the table is replicated at multiple replica nodes 922, 924, 926, the transaction may be processed as described in Example 5. An example of such a transaction is one having DML statements for table T1.

Another possible situation is if the transaction includes DML statements occurring at only one of master source node 910 and slave source node 914, but the tables involved in the transaction are distributed among multiple replica nodes. An example of such a transaction is one having DML operations for tables T2 and T3. Such a transaction may be processed by combining Examples 4 and 5. In one example, the source system 906 (such as the log generator 418 or the log sender 422 of FIG. 4) or the replica system 918 (such as the log receiver and dispatcher 470 or parallel write log replayer 476 of FIG. 4) reorder DML operations by the replica node on which they occur. In addition, the master source node 910, such as using a transaction manager, log generator, log sender, or replication manager (such as the corresponding components 624, 628, 634, 640 described in conjunction with FIG. 6), may designate one of the replica nodes 922, 924, 926 as a transaction coordinator for transactions with operations occurring at multiple replica nodes. As described in conjunction with FIGS. 7A-7C and 8, operations are precommitted at each replica node 922, 924, 926, and precommit notifications 940 are sent to the replica node acting as transaction coordinator. Once the transaction coordinator has been notified that all the component operations of a transaction have been precommitted, the transaction coordinator commits the transaction, assigns a timestamp, and notifies the other involved replica nodes of the commit operation and timestamp through postcommit notifications 940.

Yet another scenario may occur when DML statements in a transaction occur at both the master source node 906 and the slave source node 914 and the tables involved in the transaction are also distributed among multiple replica nodes 922, 924, 926. An example is a transaction with operations on tables T2 and T4. Such a transaction may be processed by combining Examples 4 and 5.

The source system 906 (such as the log generator 418 or the log sender 422 of FIG. 4) or the replica system 918 (such as the log receiver and dispatcher 470 or the parallel write log replayer 476 of FIG. 4) reorder DML operations by the source node on which the operations occur, as described in Example 4. The transactions may be reordered, if needed, by the replica nodes on which the tables occur. For example, if a transaction involves DML operations that occur on both master source node 910 and slave source node 914, but the tables involved are distributed among all three replica nodes 922, 924, 926, the transaction processing may further benefit from disaggregating the DML operations of the transaction. That is, the operations may be reordered a first time by the source node on which the transaction is executable and then reordered a second time by the replica node on which the transaction is executable.

In addition, the master source node 910, such as a transaction manager, log generator, or log sender (such as the corresponding components 414, 418, 422 described in conjunction with FIG. 4) may designate one of the replica nodes 922, 924, 926 as a transaction coordinator for transactions with DML statements occurring at multiple replica nodes. As described in conjunction with FIGS. 7A-7C and 8, operations are precommitted at each replica, and precommit notifications 940 are sent to the replica node acting as transaction coordinator. Once the transaction coordinator has been notified that all the component DML statements of a transaction have been precommitted, the transaction coordinator commits the transaction, assigns a timestamp, and notifies the other involved replica nodes of the commit operation and timestamp through postcommit notifications 940. As described above, until the postcommit notification is sent, transactions are visible to replayers, but not to external readers.

Example 7

Maintaining Cross-Table Transactional Consistency on Re-Activation of Asynchronous Table Replication One aspect of the present disclosure provides a method for assisting in synchronizing a replica system with a source system after replication, such as asynchronous table replication, has been activated or reactivated. For example, in some situations, asynchronous table replication may be manually deactivated (such as to perform maintenance) and subsequently reactivated, or may be restarted due to an exception occurring during asynchronous table replication.

Figure 10:
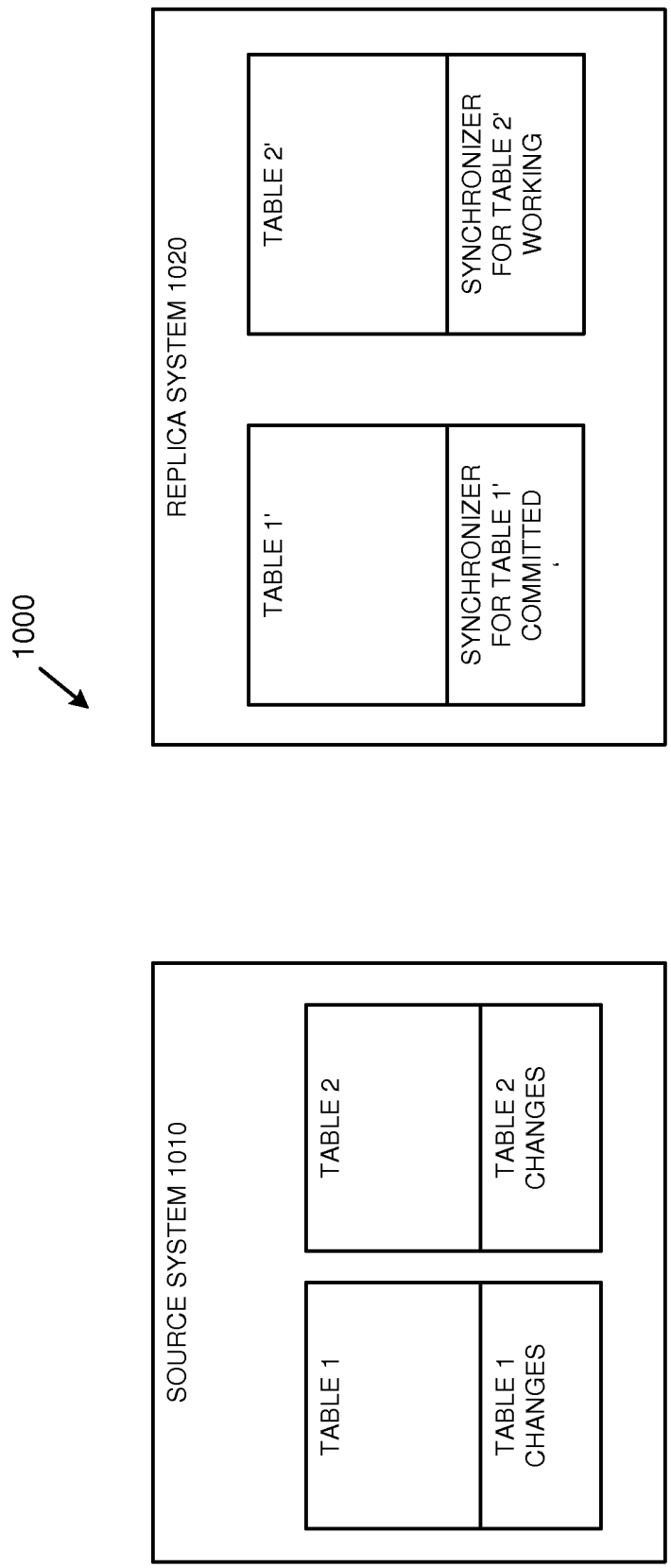
FIG. 10 is diagram depicting a database environment for synchronizing database tables maintained at a source system with copies of the database tables maintained at a replica system.

FIG. 10 illustrates a potential problem that can develop if tables are allowed to re-activate incrementally on a table-by-table basis. FIG. 10 illustrates a system 1000 having a source system 1010 that contains Tables 1 and 2 and a replica system 1020 that contains copies of Tables 1 and 2, which are being incrementally synchronized. In the source system 1010, changes to Table 1 and Table 2 have accumulated after synchronization was deactivated. Replica system 1020 shows that the synchronizer for Table 1 has finished committing the changes to Table 1', but the synchronizer for Table 2' is still working. If replica system 1020 is accessed at this point, a join operation between Table 1' and Table 2' can return inconsistent data (compared to the same join operation between Table 1 and Table 2 at the source system 1010).

Figure 11:
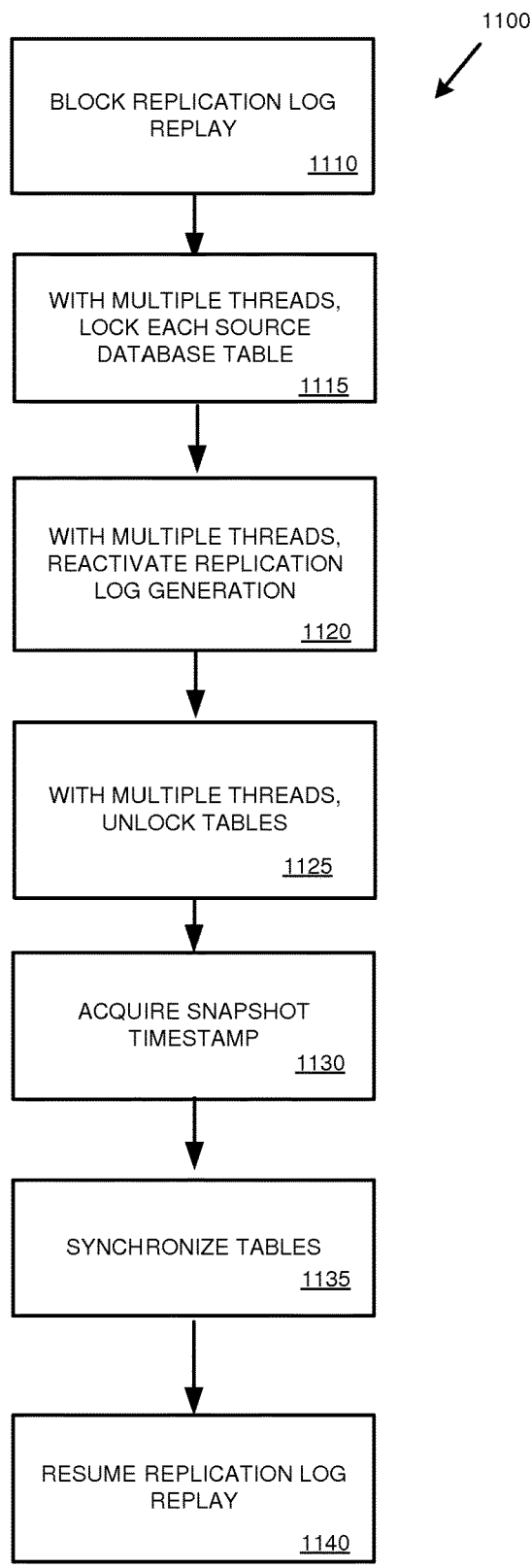
FIG. 11 is a flowchart of an example method involving a source host for synchronizing database tables maintained at a source system with copies of the database tables maintained at a replica system.

FIG. 11 provides a flowchart of an example method 1100 for assisting in maintaining consistency in read operations received by a replica system during resynchronization following activation or reactivation of asynchronous table replication. In step 1110, replication log replay, such as the processes described in Examples 1-6, is blocked. In a particular implementation, log entries continue to be generated by the source system, and may be sent to the replica system, even though the log entries are blocked from being replayed by the replica system.

To address this problem of potential inconsistencies during a reactivation period, the source system and the replica system can reactivate tables with a single internal transaction. In this way, the changes applied during reactivation can become visible at the same time, for all of the replicated tables.

In a parallel, multi-threaded process, each table in the source node is locked in step 1115. In step 1120, in a parallel, multi-threaded process, replication log generation is reactivated at each source table. The source tables are unlocked in step 1125, in a parallel, multi-threaded process. A snapshot timestamp is acquired in step 1130. The order of steps 1125 and 1130 may be reversed in some implementations of the method 1100.

In step 1135, the replica tables are selectively synchronized with the source tables. As described above, during this process, replica logs may be generated by the source node(s) and, if desired, sent to the appropriate replica node(s). However, the replica logs are not yet replayed.

Synchronization may be carried out in any suitable manner. In one specific example, synchronization is carried out by comparing the row-IDs values (as described in Example 3) of each source table and its replica table. If a row-ID value is present in the source table, but not in the replica table, the record is copied to the replica table. If the row-ID value is present in the replica table, but not in the source table, the record having that row-ID value is removed from the replica table. If the row-ID value is present in the source table and the replica table, no action is taken. Synchronization is carried out using the timestamp acquired in step 1130 (e.g., using the timestamp to select which transactions to ignore for replication log replay, and instead recover using synchronization). Thus, for example, records are synchronized between the copies of the tables (replica tables) and the source tables for any transaction having a transaction commit timestamp not later than the synchronization timestamp.

In step 1140, the resumption of replication log replay is initiated at the source host for the copies of the replicated database tables. In various implementations, initiation is carried out by the source system, the replica system, or another system in communication with the replica system.

During replication log replay, the log entry (write logs and transaction commit logs) is only replayed if the timestamp of the operation occurred later than the synchronization timestamp acquired in step 1125. Advantageously, this can help prevent transactions from be carried out multiple times, or missed logs being played even though the synchronization process already made appropriate changes to the replicated table.

Figure 12:
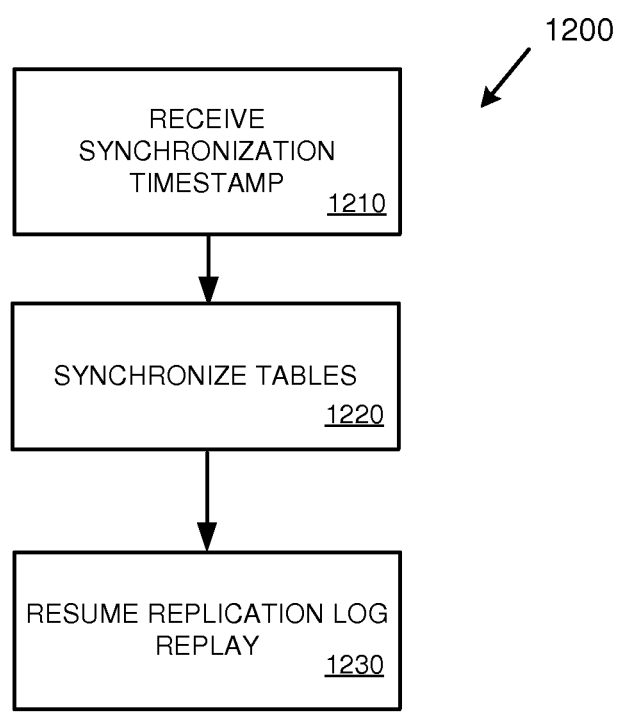
FIG. 12 is a flowchart of an example method involving a replica host for synchronizing database tables maintained at a source system with copies of the database tables maintained at a replica system.

FIG. 12 provides a method 1200 of synchronization operations implemented at least in part by the replica host. In step 1210, the replica host receives a synchronization timestamp. The copies of the database tables replicated at the replica host are selectively synchronized with the source database tables, based at least in part on the synchronization timestamp, in step 1220. In step 1230, replication log replay is resumed at the replica host, based at least in part on the synchronization timestamp. For example, the replica host executes an entry of a DML replayer log for any entry having an update timestamp not earlier than the synchronization timestamp or having a corresponding transaction commit timestamp later than the synchronization timestamp. The replica host can also execute any entry of a transaction log for any transaction commit timestamp later than the synchronization timestamp.

As described in method 1200, replica log replay is blocked for the replicated tables until the synchronization process is complete. In at least one implementation, during synchronization, the replicated tables may still receive read requests while synchronization is being carried out. However, the read requests will see the unsynchronized version of the tables, so join operations on different tables will still operate on table versions that are consistent with one another (although they may be out of date compared with data available in the source tables). Once synchronization is complete, join operations will be able to access the synchronized versions of the tables.

Figure 13:
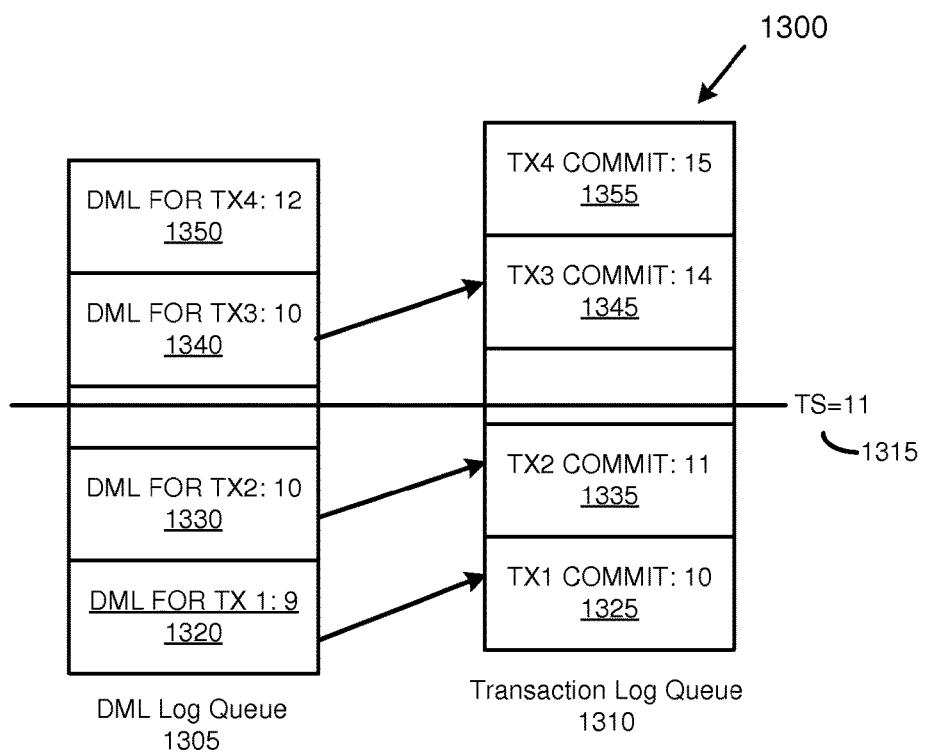
FIG. 13 is a diagram of a replica node illustrating how a synchronization timestamp may be used to determine whether write operations are replayed at the replica node.

FIG. 13 provides a diagram of a system 1300 illustrating DML and transaction log queues 1305, 1310 of a replica node illustrating how the method 1100 of FIG. 11 can assist in avoiding multiple log replay or replay of missed logs. The DML log queue 1305 is shown with multiple DML statements 1320, 1330, 1340, 1350 and the transaction log queue is shown with multiple transaction commit operations 1325, 1335, 1345, 1355. In FIG. 13, the arrows indicate relations between write operations and their corresponding transaction commit operations.

In this example, replica and source tables were synchronized with a timestamp 1315 of 11. In one aspect of the method 1100 of FIG. 11, write operations are replayed if the associated timestamp is greater than or equal to the synchronization timestamp 1315, as those statements will have occurred after synchronization completed. Write operations are also replayed if the timestamp of the commit operation is greater than the synchronization timestamp 1315, even if the timestamp of the write operation itself is less than the synchronization timestamp. Note that, in example implementations, the timestamp of a write operation is always less than the timestamp of its corresponding transaction commit operation.

Write operations 1320 and 1330 will not be replayed since their write timestamps are less than 11 and their commit timestamp is not greater than 11. Write operation 1340 will be replayed even though its write timestamp is less than 11, because the timestamp of its commit operation 1345 is greater than 11. Write operation 1350 will be replayed since its write timestamp is greater than 11. Transaction commit operations are replayed if their timestamps are greater than the synchronization timestamp. In the example of FIG. 13, transaction commit operations for TX entry 1345 and TX 1355 are replayed.

In a specific implementation, if the timestamp of the write operation is less than the synchronization timestamp, the write operation is held until the corresponding commit log is received and analyzed. As described above, if the timestamp of the commit operation is less than the synchronization timestamp, the write operation is not replayed. The write operation is replayed if the commit timestamp is greater than the synchronization timestamp.

In this way, transactions are divided by the synchronizing timestamp. Some updates (earlier updates), are replication by synchronization, while other updates (later updates, or updates from around the time the synchronization timestamp is acquired) are replicated by playback of the replication log. Missed transactions and double playback of transactions are avoided. Further, since the synchronization timestamp in effect defines a single internal transaction, readers see a consistent view of tables (all updated or all not updated).

Example 8

Computing Systems

Figure 14:
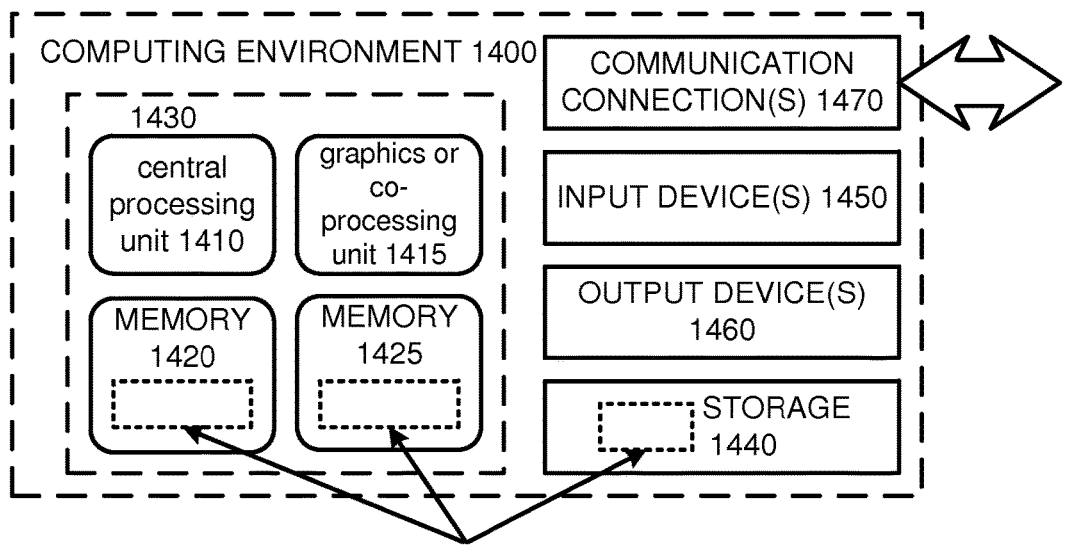
FIG. 14 is a diagram of an example computing system in which some described embodiments can be implemented.

FIG. 14 depicts a generalized example of a suitable computing system 1400 in which the described innovations may be implemented. The computing system 1400 is not intended to suggest any limitation as to scope of use or functionality of the present disclosure, as the innovations may be implemented in diverse general-purpose or special-purpose computing systems.

With reference to FIG. 14, the computing system 1400 includes one or more processing units 1410, 1415 and memory 1420, 1425. In FIG. 14, this basic configuration 1430 is included within a dashed line. The processing units 1410, 1415 execute computer-executable instructions. A processing unit can be a general-purpose central processing unit (CPU), processor in an application-specific integrated circuit (ASIC), or any other type of processor. In a multiprocessing system, multiple processing units execute computer-executable instructions to increase processing power. For example, FIG. 14 shows a central processing unit 1410 as well as a graphics processing unit or co-processing unit 1415. The tangible memory 1420, 1425 may be volatile memory (e.g., registers, cache, RAM), non-volatile memory (e.g., ROM, EEPROM, flash memory, etc.), or some combination of the two, accessible by the processing unit(s). The memory 1420, 1425 stores software 1480 implementing one or more innovations described herein, in the form of computer-executable instructions suitable for execution by the processing unit(s) 1410, 1415.

A computing system 1400 may have additional features. For example, the computing system 1400 includes storage 1440, one or more input devices 1450, one or more output devices 1460, and one or more communication connections 1470. An interconnection mechanism (not shown) such as a bus, controller, or network interconnects the components of the computing system 1400. Typically, operating system software (not shown) provides an operating environment for other software executing in the computing system 1400, and coordinates activities of the components of the computing system 1400.

The tangible storage 1440 may be removable or non-removable, and includes magnetic disks, magnetic tapes or cassettes, CD-ROMs, DVDs, or any other medium which can be used to store information in a non-transitory way and which can be accessed within the computing system 1400. The storage 1440 stores instructions for the software 1480 implementing one or more innovations described herein.

The input device(s) 1450 may be a touch input device such as a keyboard, mouse, pen, or trackball, a voice input device, a scanning device, or another device that provides input to the computing system 1400. The output device(s) 1460 may be a display, printer, speaker, CD-writer, or another device that provides output from the computing system 1400.

The communication connection(s) 1470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 9

Cloud Computing Environment

Figure 15:
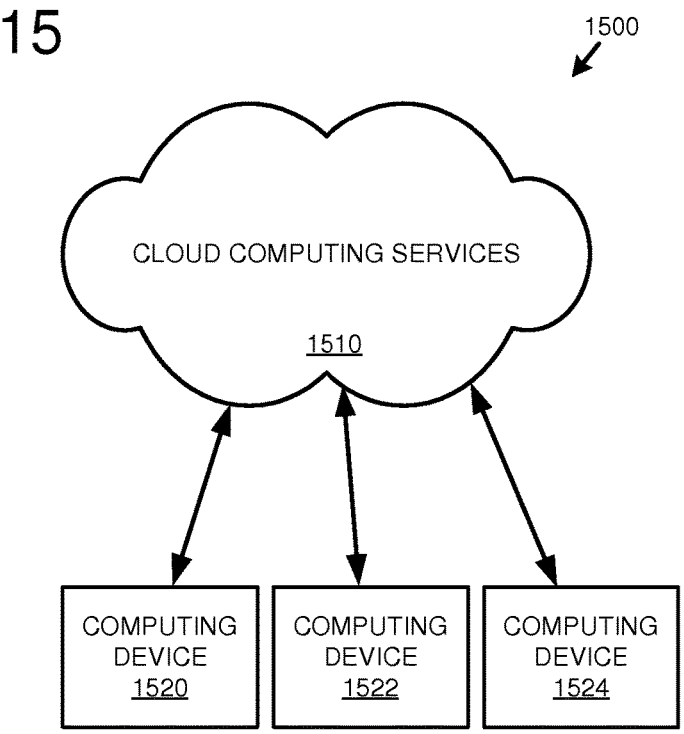
FIG. 15 is an example cloud computing environment that can be used in conjunction with the technologies described herein.

FIG. 15 depicts an example cloud computing environment 1500 in which the described technologies can be implemented. The cloud computing environment 1500 comprises cloud computing services 1510. The cloud computing services 1510 can comprise various types of cloud computing resources, such as computer servers, data storage repositories, networking resources, etc. The cloud computing services 1510 can be centrally located (e.g., provided by a data center of a business or organization) or distributed (e.g., provided by various computing resources located at different locations, such as different data centers and/or located in different cities or countries).

The cloud computing services 1510 are utilized by various types of computing devices (e.g., client computing devices), such as computing devices 1520, 1522, and 1524. For example, the computing devices (e.g., 1520, 1522, and 1524) can be computers (e.g., desktop or laptop computers), mobile devices (e.g., tablet computers or smart phones), or other types of computing devices. For example, the computing devices (e.g., 1520, 1522, and 1524) can utilize the cloud computing services 1510 to perform computing operators (e.g., data processing, data storage, and the like).

Example 10

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 14, computer-readable storage media include memory 1420 and 1425, and storage 1440. The term computer-readable storage media does not include signals and carrier waves. In addition, the term computer-readable storage media does not include communication connections (e.g., 1470).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented at least in part by a source host comprising a processing unit and memory, the source host being in communication with a replica host, the source host storing multiple database tables and the replica host storing copies of the multiple database tables, for synchronizing the copies of the multiple database tables with the multiple database tables, the method comprising:

blocking a replication log replay process running on the replica host;

while the replication log replay process is blocked, carrying out a replica synchronization process comprising:

receiving one or more database operations during the synchronization process;

generating one or more log entries for the one or more database operations received during the synchronization process;

in response to detecting that replication log replay has been blocked, in a concurrent multithreaded process, for each of the multiple database tables, with a thread:

locking the database table at the source node, wherein the locking is initiated as part of the synchronization process and not in response to requests for database operations by database clients;

while the database table is locked, reactivating replication log generation at the database table; and unlocking the database table;

acquiring a synchronization timestamp;

for records associated with a timestamp not later than the synchronization timestamp, selectively synchronizing the copies of the multiple database tables with the multiple database tables by comparing records present in the multiple database tables with records present in the copies of the multiple database tables;

sending to the replica host log entries for at least a portion of the one or more database operations received during the synchronization process; and wherein, in response to determining that the selectively synchronizing has completed:

the synchronized copies of the multiple database tables are made available to read requests received by the replica host after the synchronization has been completed for the copies of the multiple database tables; and in response to the reactivation of log replay, initiating resumption of the replication log replay process at the replica host for the copies of the multiple database tables, wherein timestamps of log entries for the one or more database operations received during the synchronization process are compared with the synchronization timestamp and log entries are replayed if the timestamp of the respective log has a defined relationship with the synchronization timestamp.

2. The method of claim 1, wherein resuming replication log replay includes:

executing an entry of a data manipulation language (DML) replayer log for any entry having an update timestamp not earlier than the synchronization timestamp or having a corresponding transaction commit timestamp later than the synchronization timestamp; and executing an entry of a transaction log for any transaction having a transaction commit timestamp later than the synchronization timestamp.

3. The method of claim 2, wherein a transaction commit timestamp of a write operation is configured to be later than the update timestamp for the write operation.

4. The method of claim 2, wherein, if the update timestamp of the write operation is less than the synchronization timestamp, the write operation is held until the corresponding transaction commit log is received and compared with the synchronization timestamp.

5. The method of claim 1, wherein synchronizing the copies of the multiple database tables is carried out in a multithreaded process.

6. The method of claim 1, wherein synchronizing the copies of the multiple database tables comprising comparing the row-ID values of records in the multiple database tables with the row-ID values of records in the copies of the multiple database tables.

7. The method of claim 1, wherein the synchronized copies of the multiple database tables are simultaneously made available for read requests when the synchronization is complete.

8. A computer system comprising a replica host comprising a processing unit and memory that implements part of a database synchronization system, the replica host being in communication with a source host that stores multiple database tables, the replica host storing copies of the multiple database tables, the replica host configured to perform a method for synchronizing the copies of the multiple database tables with the multiple database tables, the method comprising:
- disabling a replication log replay process running on the replica host;
- while the replication log replay process is disabled, carrying out a replica synchronization process comprising:
  - receiving a synchronization timestamp;
  - selectively synchronizing, based at least in part on the synchronization timestamp, the copies of the multiple database tables with the multiple database tables by comparing records present in the multiple database tables with records present in the copies of the multiple database tables; and
  - enabling replication log replay;
- receiving from the source host a plurality of log entries for a plurality of database operations received during the synchronization process;
- making the synchronized copies of the multiple database tables available to read requests received by the replica host after the synchronization has been completed for the copies of the multiple database tables;
- in response to reactivation of log replay, resuming the replication log replay process, based at least in part on the synchronization timestamp, at the copies of the multiple database tables;
- comparing log timestamps of the plurality of log entries for the plurality of database operations received during the synchronization process with the synchronization timestamp; and
- after the synchronization process is complete, replaying log entries of the plurality of log entries for the plurality of database operations received during the synchronization process having a log timestamp with a defined relationship to, the synchronization timestamp.

9. The computer system of claim 8, wherein the selectively synchronizing includes synchronizing records between the copies of the multiple database tables and the multiple database tables for any transaction having a transaction commit timestamp not later than the synchronization timestamp.

10. The computer system of claim 8, wherein the resuming replication log replay includes:
- executing an entry of a data manipulation language (DML) replayer log for any entry having an update timestamp not earlier than the synchronization timestamp or having a corresponding transaction commit timestamp later than the synchronization timestamp; and
- executing an entry of a transaction log for any transaction having a transaction commit timestamp later than the synchronization timestamp.

11. The computer system of claim 10, wherein, if the update timestamp of the write operation is less than the synchronization timestamp, the write operation is held until the corresponding transaction commit log is received and compared with the synchronization timestamp.

12. The computer system of claim 8, wherein synchronizing the copies of the multiple database tables is carried out in a multithreaded process.

13. The computer system of claim 8, wherein synchronizing the copies of the multiple database tables comprising comparing the row-ID values of records in the multiple database tables with the row-ID values of records in the copies of the multiple database tables.

14. The computer system of claim 8, wherein, while synchronizing the copies of the multiple database tables with the multiple database tables, read requests received by the replica host read the copies of the multiple database tables in a state prior to the synchronizing.

15. One or more tangible computer-readable storage media storing computer-executable instructions for causing a replica host, comprising a processing unit and memory and storing copies of multiple database tables and in communication with a source host storing multiple database tables, programmed thereby to perform a method for facilitating database synchronization within a database environment comprising the source host and the replica host, the method comprising:
- deactivating a replication log replay process running on the replica host;
- while replication log replay is deactivated, carrying out a replica synchronization process comprising:
  - receiving a synchronization timestamp;
  - selectively synchronizing, based at least in part on the synchronization timestamp, the copies of the multiple database tables with the multiple database tables by comparing records of the multiple database tables with records of the copies of the multiple database tables; and
  - reactivating log replay;
- receiving from the source host a plurality of log entries for a plurality of database operations received during the synchronization process;
- making the synchronized copies of the multiple database tables available to read requests received by the replica host after the synchronization has been completed for the copies of the multiple database tables;
- in response to the reactivation of log replay, resuming the replication log replay process, based at least in part on the synchronization timestamp, at the copies of the multiple database tables;
- comparing log timestamps of the plurality of log entries for the plurality of database operations received during the synchronization process with the synchronization timestamp; and
- after the synchronization process is complete, replaying log entries of the plurality of log entries for the plurality of database operations received during the synchronization process having a log timestamp greater than, or greater than or equal to, the synchronization timestamp.

16. The method of claim 1, wherein the initiating the resumption of the replication log replay process at the replica host is carried out concurrently for the multiple database tables.

17. The method of claim 1, wherein the unlocking is carried out concurrently for the copies of the multiple database tables.

18. The computer system of claim 8, wherein the defined relationship is a log timestamp being greater than, or greater than or equal to, the synchronization timestamp.

19. The method of claim 1, wherein the defined relationship is a log timestamp being greater than, or greater than or equal to, the synchronization timestamp.

20. The computer system of claim 8, wherein the enabling of the replication log replay is carried out concurrently for the copies of the multiple database tables.

* * * * *